(12) United States Patent
Shoji et al.

(10) Patent No.: US 7,265,371 B2
(45) Date of Patent: Sep. 4, 2007

(54) RADIATION IMAGE CONVERSION PANEL

(75) Inventors: Takehiko Shoji, Hachioji (JP); Osamu Morikawa, Hachioji (JP); Shinji Kudo, Hino (JP); Hiroshi Otani, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/144,642

(22) Filed: Jun. 6, 2005

(65) Prior Publication Data

US 2005/0274916 A1  Dec. 15, 2005

(30) Foreign Application Priority Data

Jun. 10, 2004 (JP) ............................. 2004-172612
Jun. 22, 2004 (JP) ............................. 2004-183637
Jun. 23, 2004 (JP) ............................. 2004-184870

(51) Int. Cl.
G03B 42/08 (2006.01)
(52) U.S. Cl. .................................... 250/581; 250/484.4
(58) Field of Classification Search ................ 250/580, 250/484.4
See application file for complete search history.

(56) References Cited

U.S. PATENT DOCUMENTS

| 4,939,018 | A | 7/1990 | Kohda et al. | |
| 5,023,461 | A | 6/1991 | Nakazawa et al. | |
| 6,998,159 | B2* | 2/2006 | Van den Bergh et al. | 428/35.8 |
| 2002/0066868 | A1* | 6/2002 | Shoji et al. | 250/484.4 |
| 2002/0166977 | A1* | 11/2002 | Kohda et al. | 250/484.4 |
| 2003/0152692 | A1 | 8/2003 | Morikawa et al. | |
| 2003/0160188 | A1* | 8/2003 | Tazaki | 250/484.4 |
| 2005/0040340 | A1* | 2/2005 | Morikawa et al. | 250/484.4 |

FOREIGN PATENT DOCUMENTS

| JP | 01 316696 | 12/1989 |
| JP | 01 321400 | 12/1989 |
| JP | 03 162700 | 7/1991 |

\* cited by examiner

Primary Examiner—David Porta
Assistant Examiner—Djura Malevic
(74) Attorney, Agent, or Firm—Finnegan, Henderson, Farabow, Garrett & Dunner, L.L.P.

(57) ABSTRACT

A radiation image conversion panel containing: a stimulable phosphor plate having a stimulable phosphor layer on a substrate; a first protective film provided on a stimulable phosphor layer of the substrate, the first protective film not being adhered to the surface of the stimulable phosphor layer and having a peripheral area extending outside of substrate; and a second protective film provided on the opposite side of the substrate to the stimulable phosphor layer, the second protective film having a peripheral area extending outside of the substrate, wherein the peripheral area of the first protective film and the peripheral area of the second protective film are heat-sealed with each other; and the radiation image conversion panel has a dehydrating function to dehydrate a space surrounded by the first protective film and the second protective film.

21 Claims, 5 Drawing Sheets

RADIATION IMAGE CONVERSION PANEL

This application is based on Japanese Patent Application Nos. 2004-172612, 2004-183637 and 2004-184870 filed on Jun. 10, 2004, Jun. 22, 2004 and Jun. 23, 2004, respectively, in Japanese Patent Office, the entire content of which is hereby incorporated by reference.

FIELD OF THE INVENTION

The present invention relates to a radiation image conversion panel using stimulable phosphor, particularly to a radiation image conversion panel of which characteristic degradation, resulting from moisture absorption of the stimulable phosphor upon a failure caused by the existence or occurrence of cracks in the protection layer, is controlled because of its excellent moisture resistance.

BACKGROUND OF THE INVENTION

Radiographic image represented by an X-ray image is utilized in wide applications such as for disease diagnosis. So-called radiography is mainly used as the method of obtaining an X-ray image, where the radiation through an object is irradiated on a fluorescent layer (which is also called a fluorescent screen), the visible light generated on the fluorescent layer is then irradiated on a silver halide photosensitive material (hereinafter also called photosensitive material), and a visible image is obtained through development. Recently, however, a new method of obtaining image directly from the fluorescent layer has been proposed instead of the image forming method using photosensitive material containing silver halide.

With this method, the radiation through an object is absorbed into a phosphor and then, by exciting the phosphor by optical or thermal energy for example, the radiation energy stored in the phosphor through the absorption of X-ray is irradiated as fluorescence, and the fluorescence is detected to form an image. To be concrete, it is a radiation image conversion method using stimulable phosphor as disclosed for example in the U.S. Pat. No. 3,859,527 and Japanese Patent Publication Open to Public Inspection (hereafter referred to as JP-A) No. 55-12144 (1980).

This method employs a radiation image conversion panel containing stimulable phosphor; to speak in detail, the radiation through an object is irradiated on the stimulable phosphor layer of the radiation image conversion panel so as to store radiation energy corresponding to the radiation transmission density of each portion of the object and then, by exciting the stimulable phosphor by electromagnetic wave (exciting light) such as visible ray or infrared ray, the radiation energy stored in the stimulable phosphor is emitted as stimulable light emission, and the signal of the intensity of this light is outputted for example as a photoelectrically converted electric signal so as to reproduce a visible image on an existing image recording material such as photosensitive material or on an image display such as CRT.

The above method of reproducing the radiographic image record has an advantage over the conventional radiography using a combination of radiographic photosensitive material and sensitized paper that the radiographic image containing plenty of data volume can be obtained under far less dose.

On the surface of the stimulable phosphor layer used in this technique (surface not facing the substrate), there is normally provided a protection layer for protecting the phosphor layer from chemical decomposition or physical impact. Well-known protection layers are formed as follows: (i) transparent organic polymer such as cellulose derivative or polymethyl methacrylate is dissolved into suitable solvent and then the prepared solution is applied on the phosphor layer; (ii) a protection layer forming sheet or film is separately made using organic polymer film, such as polypropylene or polyethylene terephthalate, or glass plate and then bonded on the surface of the phosphor layer with suitable adhesive; and (iii) an inorganic compound is formed into a film on the phosphor layer such as by vapor deposition.

While the stimulable phosphor is a phosphor that causes stimulable light emission by irradiating exciting light after it is irradiated with radiation as explained above, a phosphor that causes the stimulable light emission in the wavelength ranging from 300 to 500 nm at the exciting light in the wavelength ranging from 400 to 900 nm is generally employed in practice. Well-known stimulable phosphors used conventionally for the radiation image conversion panel include for example rare-earth element activated alkaline-earth metal halide fluoride type phosphor as disclosed in JP-A Nos. 55-12145, 55-160078, 56-74175, 56-116777, 57-23673, 57-23675, 58-206678, 59-27289, 59-27980, 59-56479, and 59-56480; divalent europium activated alkaline-earth metal halide type phosphor as disclosed in: JP-A Nos. 59-75200, 60-84381, 60-106752, 60-166379, 60-221483, 60-228592, 60-228593, 61-23679, 61-120882, 61-120883, 61-120885, 61-235486, and 61-235487; rare-earth element activated oxyhalide phosphor as disclosed in the JP-A No. 59-12144; cerium activated trivalent metal oxyhalide phosphor as disclosed in JP-A No. 58-69281; bismuth activate alkaline metal halide type phosphor as disclosed in the JP-A No. 60-70484 (1985); divalent europium activated alkaline-earth metal halo-phosphate phosphor as disclosed in JP-A Nos. 60-141783 and 60-157100; divalent europium activated alkaline-earth metal halo-borate phosphor as disclosed in the JP-A No. 60-157099; divalent europium activated alkaline-earth metal-hydride halide phosphor as disclosed in the JP-A No. 60-217354; cerium activated rare-earth composite halide phosphor as disclosed in the JP-A Nos. 61-21173 and 61-21182; cerium activated rare-earth halo-phosphate phosphor as disclosed in the JP-A No. 61-40390; divalent europium activated halide cerium/rubidium phosphate as disclosed in the JP-A No. 60-78151; divalent europium activated halogen phosphor as disclosed in the JP-A No. 60-78153; and 14-hedral rare-earth metal activated alkaline-earth metal halide fluoride type phosphor as disclosed in the JP-A No. 7-233369.

Of the stimulable phosphors mentioned above, divalent europium activated alkaline-earth metal halide fluoride type phosphor containing iodine, divalent europium activated alkaline-earth metal halide type phosphor containing iodine, rare-earth element activated rare-earth oxyhalide type phosphor containing iodine, and bismuth activate alkaline metal halide type phosphor containing iodine exhibit high luminance stimulable light emission.

Because the radiation image conversion panel using the above stimulable phosphors emits stored energy when scanned with exciting light after the radiographic image data has been stored, it has an advantage that the radiographic image can be stored again after scanning and so the image can be utilized repeatedly. In other words, while radiographic photosensitive material is consumed in every photo shooting in the conventional radiography, the radiation image conversion panel is utilized repeatedly in this radiation image conversion method, and so it is advantageous in view of resource preservation and economical efficiency.

Although the method of reproducing radiographic image record has a lot of advantages as explained above, the radiation image conversion panel used in this method is desired to provide images with as high sensitivity and high quality (such as sharpness and grainness) as possible.

If the radiation image conversion panel, which is required of high image quality as above, is used for a long time, there arises a problem that foreign substance such as fine dust is collected on it due to charging and the foreign substance causes foreign-substance defect on the image.

Generally, as a way for preventing the collection of foreign substance due to charging as explained above, lowering the surface resistivity is well known. A concrete means for this has been such that metal powder, carbon black or charge transfer complex is mixed in the material or applied as a coating layer so as to add conductivity to the material. This, however, is not good for practical use in view of transparency that is a fundamental characteristic of image forming material and mechanical strength that is required for protection layer material.

A further improved way is such that a coating layer containing more transparent stuff such as surface active agent or metal oxide is provided on the surface of the material as antistatic agent.

However, since surface active agent relies highly upon humidity, it cannot exhibit sufficient antistatic capability under low humidity.

In addition, in order for both surface active agent and metal oxide to add sufficient antistatic capability, that is, to allow low surface resistivity when employed in a product, they must exist on the very top surface. This, however, may deteriorate the moisture resistance that is required for a protection layer, and so a method to retain the moisture resistance may be employed when utilized in practice. (See the Patent Documents 1 and 2, for example.)

An example of a radiation image conversion panel composed of a stimulable fluorescent screen is disclosed in Patent Document 3. The radiation image conversion panel (stimulable phosphor plate 51) described in Patent Document 3 has constitution wherein a stimulable phosphor plate (stimulable phosphor plate 56), in which a stimulable phosphor layer is formed on a substrate is interposed between two moisture-proof protective films (protective layer films 57 and 59), and the peripheral areas of each moisture-proof protective film is fused by a heat-sealing method. Owing to this constitution, the stimulable phosphor plate is completely sealed by the moisture-proof protective films, to prevent the stimulable phosphor layer from becoming moist (Paragraph numbers 0028-0032, see FIG. 1).

However, in the case of the radiation image conversion panel disclosed by Patent Document 3, if a stimulable phosphor plate composed of a substrate and a stimulable phosphor layer has a thickness that is not less than the prescribed thickness, there is a possibility, when fusing each peripheral area of the moisture-proof protective film that seals the stimulable phosphor plate, that creases and waves may be formed on the moisture-proof protective film in the direction from the fused portion of each moisture-proof protective film toward the stimulable phosphor plate. In the present specification, "creases" on the moisture-proof protective film mean linear folds caused on the surface of the moisture-proof protective film, while, "waves" on the moisture-proof protective film means a gentle undulation caused on a surface of the moisture-proof protective film by difference in tension resulting from unbalanced stretching of the moisture-proof protective film.

For example, when creases and waves on the moisture-proof protective film as in the foregoing reach the radiation detection area on the stimulable phosphor plate, linear streaks and unevenness of the images may appear on the obtained radiation image, in addition to images resulting from the patient. In particular, these image defects tend to appear remarkably, when using a laser beam of excellent beam convergence to excite the stimulable phosphor layer of the stimulable phosphor plate.

On the other hand, when a crease is caused on each of both moisture-proof protective films, moisture-proof ability for the stimulable phosphor layer of the stimulable phosphor plate may be deteriorated, and quality of the stimulable phosphor plate itself may have a problem, and when generation of waves on the moisture-proof protective film is remarkable, flatness of the radiation detection surface of the stimulable phosphor plate may also be deteriorate.

As a stimulable phosphor layer of the radiation image conversion panel used for the radiation image conversion method, there is a method to use a stimulable phosphor layer composed of a microscopic pseudo-columnar block that is formed by depositing stimulable phosphor on a substrate having a microscopic uneven pattern, such as the one, for example, employed in JP-A No. 61-142497.

Further proposed are a method to use a radiation image conversion panel having a stimulable phosphor layer wherein a crack between columnar blocks each being obtained by depositing stimulable phosphor on a substrate having a microscopic pattern as described in JP-A No. No. 61-142500, is further developed; a method to use a radiation image conversion panel wherein a stimulable phosphor layer formed on the surface of a substrate is cracked from its surface side to be pseudo-columnar, as that described in JP-A No. 62-39737; and further a method to provide a crack by forming a stimulable phosphor layer having cavities on an upper surface of a substrate through vacuum evaporation, and then, by making the cavities to grow, as that described in JP-A No. 62-110200.

In JP-A No. 2-58000, there is further proposed a radiation image conversion panel having a stimulable phosphor layer, in which a slender column crystal that is at a certain angle to the direction of a normal line on a substrate, is formed on the substrate by a vapor deposition method.

In a trial to control the form of these stimulable phosphor layers, it is possible to restrain diffusion of stimulable excited light (or photo-stimulated luminenscence) to the lateral direction (arriving at the surface of the substrate after repeating reflection on the interface of cracks (column crystal)), by making all of the stimulable phosphor layers to be columnar, thus, it is possible to remarkably improve the sharpness of images formed by photo-stimulated luminescence, which is a special feature.

However, it is commonly known that most stimulable phosphors are highly hygroscopic, and if they are left under general environmental conditions, they gradually absorb moisture in the air, and capacities are considerably deteriorated with a lapse of time, in the radiation image conversion panel having these stimulable phosphor layers formed by a vapor growth (deposition) method.

There has been employed a method to prevent moisture absorption of stimulable phosphor layers by forming a barrier by using a moisture-proof protective film on which a thin film of metal oxide or of silicon nitride is deposited, and by sealing the stimulable phosphor layer formed by dispersing europium-activated alkaline earth metal fluoride halide type phosphor particles in a binder, as described, for example, in Patent Document 4.

Further, with respect to protection against water vapor for moisture-absorbing phosphor, Patent Document 5, for example, discloses an example to use a laminated film wherein a polyparaxylene film and a moisture-proof film such as silica are formed in succession by a CVD method, for protecting a phosphor, such as CsI representing a scintillator material, against water vapor.

However, a stimulable phosphor crystal formed by the vapor deposition method is more hygroscopic than a stimulable phosphor layer formed by dispersing europium-activated alkaline earth metal fluoride halide phosphor particles in a binder, and also more than a phosphor such as CsI representing a scintillator material, and there is no protection by the binder for stimulable phosphor crystal made by a vapor deposition method, thus, protection against water vapor is more important and a method for total prevention of moisture adsorption has been desired.

(Patent Document 1) JP-A No. 10-82899
(Patent Document 2) JP-A No. 2002-122698
(Patent Document 3) JP-A No. 2000-171597
(Patent Document 4) JP-A No. 11-344598
(Patent Document 5) JP-A No. 2001-235548

SUMMARY OF THE INVENTION

An object of the present invention is to provide a radiation image conversion panel exhibiting excellent moisture resistance by use of a moistureproof film free from creases and waves and to provide radiation images without unevenness, and linear defects.

One of the aspects of the present invention is a radiation image conversion panel containing: a stimulable phosphor plate having a stimulable phosphor layer on a substrate; a first protective film provided on a stimulable phosphor layer of the substrate, the first protective film not being adhered to the surface of the stimulable phosphor layer and having a peripheral area extending outside of substrate; and a second protective film provided on the opposite side of the substrate to the stimulable phosphor layer, the second protective film having a peripheral area extending outside of the substrate, wherein the peripheral area of the first protective film and the peripheral area of the second protective film are heat-sealed with each other; and the radiation image conversion panel has a dehydrating function to dehydrate a space surrounded by the first protective film and the second protective film.

DESCRIPTION OF THE PREFERRED EMBODIMENTS

Figure 1:
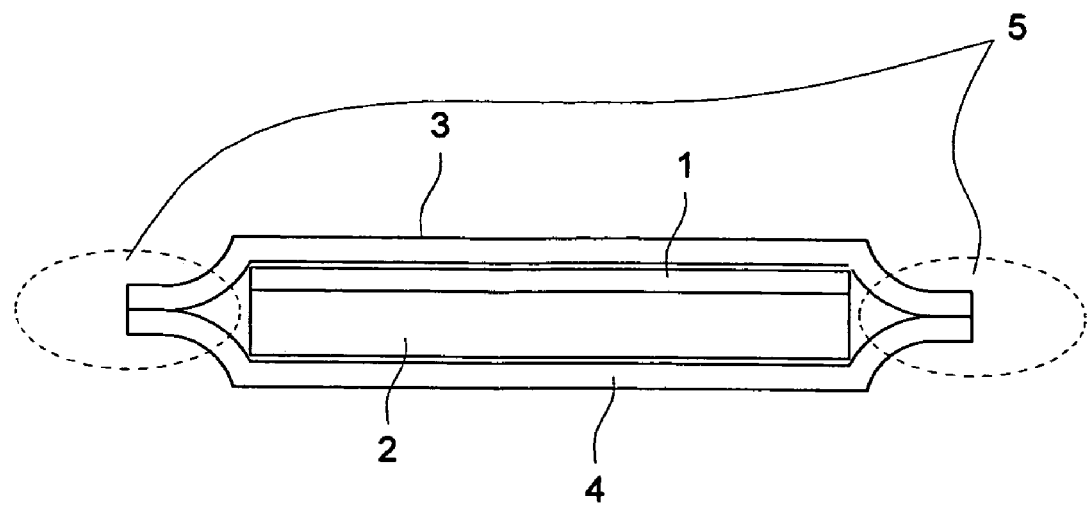
FIG. 1 is a schematic drawing illustrating an example of sealing the stimulable phosphor plate of the present invention.

The above object of the present invention is achieved by the following structures.

(1) A radiation image conversion panel containing:
a stimulable phosphor plate having a stimulable phosphor layer on a substrate;
a first protective film provided on a stimulable phosphor layer side of the stimulable phosphor plate, the first protective film not being adhered to the surface of the stimulable phosphor layer and having a peripheral area extending outside of the stimulable phosphor plate; and
a second protective film provided on the opposite side of the stimulable phosphor plate to the stimulable phosphor layer, the second protective film having a peripheral area extending outside of the stimulable phosphor plate,
wherein:
the peripheral area of the first protective film and the peripheral area of the second protective film are heat-sealed with each other; and
the radiation image conversion panel has a dehydrating function to dehydrate a space surrounded by the first protective film and the second protective film.

(2) The radiation image conversion panel of Item (1), wherein: at least one of the first protective film and the second protective film has the dehydrating function; and the stimulable phosphor layer is formed by a coating method.

(3) The radiation image conversion panel of Item (1), wherein: at least one of the first protective film and the second protective film has the dehydrating function; and the stimulable phosphor layer is formed by a vapor deposition method.

(4) The radiation image conversion panel of Item (1), wherein: the first protective film and the second protective film enclose both a dehydrator and the stimulable phosphor plate; and the stimulable phosphor layer is formed by a coating method.

(5) The radiation image conversion panel of Item (1), wherein: the first protective film and the second protective film enclose both a dehydrator and the stimulable phosphor plate; and the stimulable phosphor layer is formed by a vapor deposition method.

(6) The radiation image conversion panel of Item (1), wherein: the stimulable phosphor plate has the dehydrating function; and the stimulable phosphor layer is formed by a coating method.

(7) The radiation image conversion panel of Item (1), wherein: the stimulable phosphor plate has the dehydrating function; and the stimulable phosphor layer is formed by a vapor deposition method.

(8) The radiation image conversion panel of any one of Items (1) to (7), wherein the first protective film contains an excited light absorbing layer, the excited light absorbing layer being a colored layer so that the excited light is absorbed.

(9) The radiation image conversion panel of Item (1), wherein the first protective film and the second protective film are moisture-proof protective films.

(10) The radiation image conversion panel of Item (9), wherein: the stimulable phosphor layer is formed by a vapor deposition method; and a thickness of the stimulable phosphor plate is not more than 2 mm.

(11) The radiation image conversion panel of Item (10), wherein a thickness of the substrate is not more than 0.2 mm.

(12) The radiation image conversion panel of Item (10) or Item (11), wherein: the first protective film has a laminated structure containing two or more resin layers; and the resin layer facing the stimulable phosphor layer is a heat-sealable layer.

(13) The radiation image conversion panel of any one of Items (10) to (12), wherein the first protective film has a laminated structure containing a metal oxide layer.

(14) The radiation image conversion panel of any one of Items (10) to (13), wherein the second protective film has a laminated structure containing an aluminum layer.

(15) A radiation image conversion panel containing:
a stimulable phosphor plate having a stimulable phosphor layer formed by a vapor deposition method on a substrate, the substrate having a peripheral area where the stimulable phosphor layer is not formed; and
a protective film provided on a stimulable phosphor layer side of the stimulable phosphor plate,
wherein the protective film is heat-sealed with the substrate using an adhesive sheet containing a heat-sealable resin layer at the peripheral area of the substrate where the stimulable phosphor layer is not formed.

(16) The radiation image conversion panel of Item (15), wherein an outer most layer of the protective film facing the stimulable phosphor plate is a heat-sealable resin layer.

(17) The radiation image conversion panel of Item (15) or Item (16), wherein the protective film has a laminated structure containing a resin layer on which a metal oxide layer is formed by evaporation.

(18) The radiation image conversion panel of any one of Items (15) to (17), wherein an alkali-halide stimulable phosphor layer is formed by a vapor deposition method on the substrate, the alkali-halide stimulable phosphor being represented by Formula (1):

$$M^1X \cdot aM^2X'_2 \cdot M^3X''_3 : eA \qquad \text{Formula (1)}$$

wherein: $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; and $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X'' each represent a halogen selected from the group consisting of F, Cl, Br and I; A represents a metal selected from the group consisting of Eu, TB, In, Ga, Cs, Ce, Tm, Dy, Pr, Ho, Nd, Yb, Er, Gd, Ru, Sm, Y, Tl, Na, Ag, Cu and Mg; and a, b and e represent values of $0 \leq a < 0.5$, $0 \leq b < 0.5$ and $0 \leq e < 0.2$, respectively.

(19) A radiation image conversion panel containing:
a stimulable phosphor plate having a stimulable phosphor layer formed by a vapor deposition method on a substrate, the substrate having a peripheral area on a stimulable phosphor layer side of the substrate where the stimulable phosphor layer is not formed;
an adhesive sheet containing a heat-sealable resin layer which covers both (i) the peripheral area of the stimulable phosphor layer side of the substrate where the stimulable phosphor layer is not formed and (ii) a peripheral area of the opposite side of the substrate to the stimulable phosphor layer by folding the adhesive sheet containing the heat-sealable resin sheet; and
a first protective film provided on the stimulable phosphor layer side of the substrate and a second protective film provided on the opposite side of the substrate to the stimulable phosphor layer,
wherein:
the first protective film is heat-sealed with the substrate at the peripheral area of the stimulable phosphor layer side of the substrate where the stimulable phosphor layer is not formed and the second protective film is heat-sealed at the peripheral area of the opposite side of the substrate using the adhesive sheet containing the heat-sealable resin layer.

(20) The radiation image conversion panel of Item (19), wherein an outer most layer of the protective film facing the stimulable phosphor layer is a heat-sealable resin layer.

(21) The radiation image conversion panel of Item (19) or Item (20), wherein the protective film has a laminated structure containing a resin layer on which a metal oxide layer is formed by evaporation.

(22) The radiation image conversion panel of any one of Items (19) to (21), wherein an alkali-halide stimulable phosphor layer is formed by a vapor deposition method on the substrate, the alkali-halide stimulable phosphor being represented by Formula (1):

$$M^1X \cdot aM^2X'_2 \cdot M^3X''_3 : eA \qquad \text{Formula (1)}$$

wherein: $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; and $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X'' each represent a halogen selected from the group consisting of F, Cl, Br and I; A represents a metal selected from the group consisting of Eu, TB, In, Ga, Cs, Ce, Tm, Dy, Pr, Ho, Nd, Yb, Er, Gd, Ru, Sm, Y, Tl, Na, Ag, Cu and Mg; and a, b and e represent values of $0 \leq a < 0.5$, $0 \leq b < 0.5$ and $0 \leq e < 0.2$, respectively.

A radiation image conversion panel according to the present invention has excellent moisture resistance and provides images free from unevenness and linear defect, producing excellent effect.

A method of having the radiation image conversion panel of the present invention contain dehydrator can be for example 1) and 2) below.

1) Having at least one portion selected from the protection layer and stimulable phosphor plate contain dehydrator.

2) Enclosing the protection layer containing dehydrator and the stimulable phosphor plate together.

Herein, a stimulable phosphor plate means a substrate on which a stimulable phosphore layer is formed.

A method of providing the stimulable phosphor layer of the present invention on a substrate can be 1) and 2) below.

1) A coating method
2) A vapor deposition method

Through energetic examination for accomplishing the above object, the inventors come to pay attention to the capillary suction capability of hygroscopic resin itself, which has never been noticed as a capability of hygroscopic resin. Also, the inventors have found out that, by adding dehydration function to at least one portion selected from the protection layer and stimulable phosphor plate and preferably by establishing the below-mentioned specific relationship between: (i) the capillary suction capability of liquid diffusing member and liquid gaining member; and (ii) the capillary suction capability of the hygroscopic resin, the hygroscopic resin can smoothly suck liquid from the liquid diffusing member and also the hygroscopic resin can smoothly suck liquid from the liquid gaining member without using other auxiliary suction materials such as one having large surface area as disclosed in the International Publication WO99/47184, and hence the object of the present invention can be accomplished.

Capillary suction capability, which will be described later in detail, is measured using a later-mentioned apparatus, where a test specimen (hygroscopic resin) is placed higher than the liquid level of physiological saline solution in a reservoir by some tens centimeter and the capillary suction capability of sucking the liquid against the negative pressure caused of the water column at that height is measured.

There has been a case where the suction capability is measured under no negative pressure, that is, with the liquid surface of the reservoir and the test specimen being at the same height (see the International Publication WO88/01282) but there has never been a case where the capillary suction capability of hygroscopic resin itself is measured under negative pressure, and therefore correlation between the capillary suction capability of the hygroscopic resin measured by the method of the present invention and the performance of absorbent has not been known. That is to say, the inventor has found out that, by making the absorbent and hygroscopic material from the hygroscopic resin that is characteristic of maintaining the above correlation corresponding to the properties of the liquid diffusing member and liquid gaining member, a system of liquid from dispersion to storage, from gaining to storage, or from gaining to storage and dispersion functions favorably in the absorbent and accordingly the absorbent and hygroscopic material having very excellent liquid suction capability can be offered from a very simple production process. Thus, the present invention has been made.

In addition, the inventor has found out that fine powder of the hygroscopic resin can be granulated very efficiently by using such hygroscopic resin powder, of which weight-average grain size (the weight-average grain size of the hygroscopic resin of the present invention is measured by sieving, which will be explained later, and is a weight average of sieve sizes) is within a specified range and of which grain-to-grain spacing ratio after the grains have sucked liquid and then are saturated and swelled under no pressure and grain-to-grain average spacing radius after the grains have sucked and then are saturated and swelled under no pressure are within a specified range, and also by using solution dispersed with water dispersible fine particle as binder; and that the hygroscopic grains which have high bond strength and re-dispersibility and are applicable suitably to the absorbent and hygroscopic material of the present invention can be obtained easily and hence excellent hygroscopic characteristic is obtained. Thus, the present invention has been made.

That is to say, it is preferred that the absorbent of the present invention is an absorbent containing liquid diffusing member and hygroscopic resin and that, given the capillary absorption index of the liquid diffusing member at a height of 40 cm is A (however, $A \geq 0.10$), the capillary suction index B of the hygroscopic resin at a height of 40 cm satisfies the equation below:

$$B/A \geq 0.7 \qquad \text{(Equation 1)}$$

It is preferred that another absorbent used for the present invention is an absorbent containing liquid diffusing member and hygroscopic resin and that, given the capillary absorption factor of the liquid diffusing member at a height of 40 cm is C (however, $C \geq 2.0$ (g/g)), the capillary suction factor D of the hygroscopic resin at a height of 40 cm satisfies the equation below:

$$D/C \geq 0.7 \qquad \text{(Equation 2)}$$

It is preferred that another absorbent used for the present invention is an absorbent containing liquid diffusing member and liquid storage member and that a member of which suction height is more than 30 cm is used as the liquid diffusing member and a hygroscopic resin of which capillary suction factor D at a height of 40 cm is more than 15 (g/g) is used as the liquid storage member.

It is preferred that another absorbent used for the present invention is an absorbent containing liquid diffusing member and liquid storage member and that a member of which suction height is more than 30 cm is used as the liquid diffusing member and a hygroscopic resin which is surface-bridged and of which weight-average grain size is less than 250 μm is used as the liquid storage member.

It is preferred that another absorbent used for the present invention is an absorbent containing liquid diffusing member and hygroscopic resin of which main component is polyacrylic (acrylate) bridged polymer and the liquid diffusing member is porous polymer obtained by polymerizing high internal-phase emulsion and that the ratio of the mass of the hygroscopic resin to the total mass of the liquid diffusing member and hygroscopic resin is more than 75 weight % but less than 90 weight %.

It is preferred that another absorbent used for the present invention is an absorbent containing a hygroscopic resin layer made of liquid gaining member and hygroscopic resin of which dissemination is more than 250 g/m² and that, given the capillary suction index of the liquid gaining member at a height of 40 cm is E (however, $E < 0.1$), the capillary suction index B of the hygroscopic resin at a height of 40 cm satisfies the equation below:

$$B/E \geq 10 \qquad \text{(Equation 3)}$$

It is preferred that another absorbent used for the present invention is an absorbent containing a hygroscopic resin layer made of liquid gaining member and hygroscopic resin of which dissemination is more than 250 g/m² and that, given the capillary suction index of the liquid gaining member at a height of 40 cm is E (however, $E < 0.1$), the capillary suction index F of the hygroscopic resin layer at a height of 40 cm satisfies the equation below:

$$F/E \geqq 10 \qquad \text{(Equation 4)}$$

It is preferred that another absorbent used for the present invention is an absorbent containing a hygroscopic resin layer made of liquid gaining member and hygroscopic resin of which dissemination is more than 250 g/m² and that the capillary suction factor G of the liquid gaining member at a height of 40 cm is less than 1.0 (g/g) and that the capillary suction factor D of the hygroscopic resin at a height of 40 cm is less than 5 (g/g).

It is characteristic that another absorbent used for the present invention is an absorbent containing a hygroscopic resin layer made of liquid gaining member and hygroscopic resin of which dissemination is more than 250 g/m² and that the capillary suction factor G of the liquid gaining member at a height of 40 cm is less than 1.0 (g/g) and that the capillary suction factor H of the hygroscopic resin layer at a height of 40 cm is less than 5 (g/g).

The hygroscopic material (dehydrator, absorbent) of the present invention has a dehydrating function.

The hygroscopic resin grain of the present invention is granulated from hygroscopic resin of which weight-mean grain size is 50 to 300 μm, grain-to-grain spacing ratio when saturated and swelled in physiological saline solution (0.9 weight % NaCl water solution) under no pressure is 30 to 50%, and grain-to-grain average spacing radius when saturated and swelled under no pressure is 80 to 150 μm, and the weight-mean grain size of the hygroscopic resin grain has been increased by more than 50% compared to that before the granulation.

Another hygroscopic resin grain used for the present invention is one of which main component is polyacrylic (acrylate) bridged polymer and of which capillary suction factor D at a height of 40 cm is more than 25 (g/g).

The method of producing the hygroscopic resin grain of the present invention is preferable because, by adding a solution dispersed with water-dispersible fine grains to the hygroscopic resin of which weight-mean grain size is 50 to 300 μm, grain-to-grain spacing ratio when saturated and swelled in physiological saline solution (0.9 weight % NaCl water solution) under no pressure is 30 to 50%, and grain-to-grain average spacing radius when saturated and swelled under no pressure is 80 to 150 μm, the weight-mean grain size can be increased by more than 50%.

The hygroscopic material of the present invention contains the hygroscopic resin grains of the present invention.

It is preferred that the hygroscopic resin of the present invention is one of which main component is polyacrylic (acrylate) bridged polymer and of which capillary suction factor D at a height of 40 cm is more than 25 (g/g)

The hygroscopic material of the present invention contains the hygroscopic resin of the present invention.

The hygroscopic resin of the present invention is evaluated by measuring the suction factor at which the hygroscopic resin sucks liquid within a specified length of time on condition that the height H1 of the liquid sucking position is higher than the height H2 of the liquid level in the liquid reservoir.

The capillary suction capability employed in the present invention is included in the conventional evaluation items that have generally been used for evaluating the suction force of absorbing material such as paper and pulp which sucks and absorbs liquid by the capillary phenomenon, and the capillary suction force and liquid sucking capability of a specimen is evaluated by measuring the amount of liquid sucked per unit weight of the specimen by a later-mentioned apparatus under a condition where the height of the liquid sucking position is varied. A concrete method of measuring the capillary suction factor, which is the capillary suction capability in the present invention, will be described later along with preferred embodiments. However, a measuring method under the same principle is disclosed for example in the Textile Research Journal Vol. 57, 356 (1967), "Absorbency" (Chatterjee, Textile Science and Technology, Vol. 7, 1985), JP-A No. 8-52349, and International Publication WO99/47184.

The method of evaluating the hygroscopic resin of the present invention by measuring the suction factor at which the hygroscopic resin sucks liquid within a specified length of time on condition that the height H1 of the liquid sucking position is higher than the height H2 of the liquid level in the liquid reservoir has enabled to find out that, by applying the above technique to hygroscopic resin for the first time and evaluating the result, the capability of the hygroscopic resin for sucking liquid from other base materials such as liquid diffusing member and liquid gaining member can be judged correctly. In order to improve the measuring accuracy and increase the correlation with the performance of the absorbent, it is preferred to evaluate on condition that the difference in heights between the liquid sucking position H1 and liquid level H2 in the liquid reservoir is 20 to 60 cm, and further preferably that the difference in heights is 30 to 50 cm.

The capillary suction capability in the present invention includes two types: capillary suction factor and capillary suction index. The capillary suction factor in the present invention is obtained by measuring the amount of liquid (factor) a specimen sucks in 30 minutes under a condition where the liquid sucking position and liquid level in the liquid reservoir are at different height. When the difference in heights between the liquid sucking position and liquid level in the liquid reservoir is 40 cm, it is defined as "capillary suction factor at a height of 40 cm" and when the difference in heights between the liquid sucking position and liquid level in the liquid reservoir is 0 cm, it is defined as "capillary suction factor at a height of 0 cm".

The capillary suction index in the present invention is obtained by dividing the capillary suction factor, at which a specimen sucks in 30 minutes under a condition where the liquid sucking position and liquid level in the liquid reservoir are at different height, by the capillary suction factor at a height of 0 cm at which the specimen sucks in 30 minutes under a condition where the difference in heights between the liquid sucking position and liquid level in the liquid reservoir is 0 cm. The "capillary suction index at a height of 40 cm" is obtained by dividing the "capillary suction factor at a height of 40 cm" under a condition where the difference in heights between the liquid sucking position and liquid level in the liquid reservoir is 40 cm by the "capillary suction factor at a height of 0 cm" under a condition where the difference in heights between the liquid sucking position and liquid level in the liquid reservoir is 0 cm.

In order to exhibit the capillary suction capability of the hygroscopic resin in the present invention, balance between the capillary suction force resulting from the physical shape of the hygroscopic resin and the suction characteristic resulting from the osmotic pressure of various polymers themselves formed through surface bridging is regarded very much important.

(Definition of the Dehydration Function)

The dehydration function in the present invention means the function of various materials that can trap water (mainly steam but may be water itself in case of a defect (such as pinholes) on the protection layer) and eliminate the characteristic degradation of the stimulable phosphor caused by moisture absorption (wetting with water).

There are two types of materials that have the dehydration function: one that is reactive (ordinary hydrating agent) and the other that traps steam and water such as absorbing agent of which dominant performance is absorption.

The dehydration function can be added by having at least one portion selected from the protection layer and stimulable phosphor plate contain dehydrator.

Typical dehydrator includes silica, silica gel, and calcium chloride, and products commercially available are for example Bellsunny (Kanebo) (humidity conditioning at 70%), Mossfine (Toyobo) (humidity conditioning at 70%), Arrow Sheet (Shinagawa Chemicals) (humidity conditioning at less than 50%), Zeo Sheet (Shinagawa Chemicals) (humidity conditioning at less than 50%), and Fleclone Sheet (OG Corporation) (humidity conditioning at 70%). (Some partly contain absorbing agent.) Absorbing agent may be hygroscopic polymer or the like.

The compounds that add the dehydration function are explained hereunder.

(Hygroscopic Polymer)

Hygroscopic polymer is a polymer that absorbs water of about 5 to 1200 times greater than its self-weight and is available in acrylic acid type, starch/acrylic acid type, maleic acid type, cellulose type, and synthetic polymer type. Naturally, the amount of water absorption depends upon the ion type and ion intensity in the polymer. Hygroscopic polymers are for example Ara Soap (Arakawa Chemical Industries), Wondergel (Kao Corporation), Sumikagel (Sumitomo Chemical), Aquakeep (Sumitomo Seika Chemical), Lanseal (Japan Exlan), Favor (Stockhausen), Hysorb (BASF), and Aqualic (Nippon Shokubai), and starch/acrylic acid type is for example Sun Wet (Sanyo Chemical Industries) and Water Lock (Grain Processing), maleic acid type is for example KI Gel (Kuraray Isoprene), cellulose type is for example Aqualon (Hercules) and Drytech (Dow Chemical), and synthetic polymer type is for example Aqua Reserve GP (Nippon Synthetic Chemical Industry).

The liquid diffusing member that is preferably applicable to the present invention is preferred to have the suction height of more than 30 cm, which is the capability of sucking liquid in the vertical direction as explained previously, and more than 40 cm more preferably and more than 50 cm further more preferably. If it is less than 30 cm, the liquid dispersion ratio of the absorbent becomes low and so the whole part of the absorbent cannot be utilized effectively.

Shape of the liquid diffusing member can be sheet, fabric, particle, slip, or others but a sheet type is generally preferred. The weight of the liquid diffusing member in a sheet shape is preferred to be 50 to 500 $g/m^2$ and more preferably 100 to 200 $g/m^2$.

Polyester film, poly-methacrylate film, nitrocellulose film, and cellulose acetate film are applicable as the resin film which is the base of the laminated film coated with a layer having the dehydration function and used as the protective film (resin layer and protection layer), and film such as polypropylene film, polyethylene terephthalate film and polyethylene naphthalate film is preferable as the protective film because of its transparency and strength. For the resin compound layer containing fluorocarbon resin, olefin (fluoro-olefin) polymer containing fluorine or copolymer containing fluorine contained olefin as copolymer component is preferable because of high flaw resistance.

The protection layer used in the present invention is a transparent organic polymer such as the above-mentioned cellulose derivative and polymethyl methacrylate or organic polymer film such as polypropylene and polyethylene terephthalate, made into a layer having the afore-mentioned electrostatic induction protection effect and then formed as a lamination film on the phosphor layer in a thickness enough for the required conveyance durability, but organic polymer film is more preferable in view of the strength and it can be coated with a resin compound layer containing fluorocarbon resin as needed.

FIG. 1 is a brief view of an example where the stimulable phosphor plate of the present invention is enclosed. In order to more surely prevent entry of moisture into the stimulable phosphor plate, cut to a specified size and provided with the stimulable phosphor layer on a substrate, the peripheral areas of the moisture-proof protective films provided on both sides of the stimulable phosphor plate are positioned outside the peripheral areas of the stimulable phosphor plate and the top and rear moisture-proof protective films, namely, the moisture-proof protective films on the stimulable phosphor layer side of the substrate and the opposite side of the substrate to the stimulable phosphor layer, are fused together or bonded with adhesive in an area outside the peripheral areas of the stimulable phosphor plate. This enclosing construction (see FIG. 1) enables to prevent entry of moisture from the peripheral areas of the stimulable phosphor plate.

In FIG. 1, 1 is the stimulable phosphor layer (formed by a coating method (coated type) or by a vapor deposition method (vapor deposition type) and 2 is the substrate. Substrate may be made of PET for the coated type and crystallized glass for the vapor deposited type. 3 and 4 are the moisture-proof protective films, where 3 is the moisture-proof protective film on the stimulable phosphor side of the stimulable phosphor plate and 4 is the one on the opposite side of the stimulable phosphor layer. 5 is a heat-sealed portion.

In realizing this enclosed construction, the most outer resin layer, contacting the stimulable phosphor plate, of the moisture-proof protective film on the phosphor surface is made of thermally fusing resin so that the top and rear moisture-proof protective films can be fused together in an area outside the peripheral areas of the stimulable phosphor plate, thereby allowing efficient enclosing process.

The thermally fusing film in the present invention means a film that can be fused by an ordinarily employed impulse sealer, including ethylene vinyl acetate copolymer (EVA) or polypropylene (PP) film and polyethylene (PE) film but not limited thereto.

In using the above fusing film for the protective film of the present invention, suitable moisture resistance can be accomplished by laminating multiple sheets of fusing films together as needed to meet the required moisture resistance. Any well-known lamination method is applicable but dry lamination method is preferable because of its excellent workability.

It is preferred in the radiation image conversion panel that the outer surface of the above protective films (protection layer) opposing to the phosphor layer is matted and the average slope angle $\Delta a$ of the surface roughness of the protection layer is more than 0.01 and less than 0.1.

The average slope angle $\Delta a$ of the surface roughness in the present invention means the mathematical average slope angle $\Delta a$ according to JIS-B0601 (1998).

In order to increase the average slope angle Δa of the surface roughness of the protective film, several processes are available: for example, the protective film surface is coated with a fluorocarbon resin contained resin compound layer disperse with inorganic material such as silica is employed or a suitable type of resin film is selected for the top surface in the method of laminating multiple films together, but not limited thereto.

Resin films of various surface shapes are widely available in the market and so it is easy to select a film that has the required average slope angle Δa.

Films such as polypropylene film, polyethylene terephthalate film and polyethylene naphthalate film have excellent physical properties in terms of strength as the protective film. Because of their high refraction factor, however, part of the exciting light entering into the protective film is reflected repeatedly on the top and rear interfaces of the film and transferred up to a position far from the scanned position, and consequently the stimulable light is emitted there, resulting in poor sharpness. In addition, the exciting light reflected on the top and rear interfaces of the protective film in the direction opposite to the phosphor layer surface is again reflected on a light detector or other peripheral members, and consequently the stimulable phosphor layer at a position far from the scanned position is excited and so the stimulable light is emitted, also resulting in poor sharpness. Since the exciting light is a coherent light having long wavelength from red to infrared, little is absorbed inside the protective film or in an inside space of a reading apparatus but it is transferred to a far apart position, resulting in poor sharpness.

Accordingly, it is preferred to provide an exciting light absorption layer that is expected to be effective in eliminating scattered light or reflected light.

The exciting light absorption layer is a layer containing such coloring agent that absorbs the exciting light selectively. One side or both sides of the protective film may be coated with this layer, or the protective film itself may be colored so as to act as an exciting light absorption layer.

If a film such as polypropylene film, polyethylene terephthalate film or polyethylene naphthalate film is used as a component of the protection layer as set forth in the present invention, any density other than that of the radiographic image of object, such as unevenness in the image, or linear noise probably resulting from the production process of the protective film can be reduced.

This effect becomes remarkable if the average slope angle Δa is more than 0.01.

The total reflection of the exciting light on the interface of the protection layer (protective film) is supposed to be prevented at a slope angle Δa near this value, but since this effect is minimal if the protective film is not provided with an exciting light absorption layer, the above effect is estimated to be the synergy effect of the scattering prevention effect by the exciting light absorption layer and total reflection prevention by the average slope angle Δa of the surface roughness.

Because the present invention enables to utilize the protective film of a required thickness having high heat resistance without deteriorating the image quality and without losing the water resistance, moisture resistance and solvent resistance required for the protection layer material, it becomes possible to realize a radiation image conversion panel that maintains excellent heat resistance for a long time.

When a resin film is employed for the protective film, it can be constructed by laminating multiple resin films or deposition films, that is, resin films on which metal oxide is vapor-deposited as needed to meet the required flaw resistance and moisture resistance.

When multiple films are laminated as above, it is preferred to provide additional exciting light absorption layer between each laminated resin film because the exciting light absorption layer is protected from physical impact and chemical deformation and hence stable plate performance can be maintained for a long time. Such exciting light absorption layer may be provided at multiple positions or coloring agent may be so contained in the bonding layer for laminating the resin films that it function as an exciting light absorption layer.

For bonding the protective film with the stimulable phosphor plate, any well-known method is applicable but it is easy from a working view point to apply adhesive (resin having thermal fusing capability) beforehand on the side of the protective film to be bonded with the stimulable phosphor plate and thermally fuse them together using a heat roller.

The surface shape of the protective film can be easily adjusted by selecting an applicable resin film or coating the resin film surface with a film containing inorganic material. In addition, this coated film can be colored so as to function as an exciting light absorption layer. These days, resin film having required surface shape is easily available.

A method of coloring the protective film of a radiation image conversion panel so as to control scattered light and reflected light and improve the sharpness has been disclosed in the Japanese Patent Publication No. SHO 59-23400 (1984) where each of the substrate, under layer, phosphor layer, intermediate layer and protection layer, all constituting a radiation image conversion panel, is colored in one of various embodiments.

The coloring agent used for the protective film of the radiation image conversion panel is one that has a characteristic of absorbing the exciting light of the radiation image conversion panel.

It is preferred that the exciting light absorption layer is so provided that the light transmission factor of the protective film at the exciting light wavelength is 98% to 50% of the light transmission factor of the same protective film having no exciting light absorption layer (for example He—Ne laser beam (633 nm)). If the light transmission factor exceeds 98%, the effect of the present invention becomes less and if it is less than 50%, the luminance of the radiation image conversion panel decreases sharply.

What type of coloring agent must be used depends upon the type of the stimulable phosphor used in the radiation image conversion panel, and the stimulable phosphor used in the radiation image conversion panel is normally such that emits stimulable light of a wavelength ranging from 300 to 500 nm by the exciting light of a wavelength ranging from 400 to 900 nm. Accordingly, organic or inorganic coloring agent of blue to green is normally used.

Typical organic coloring agent of blue to green includes Zapon Fast Blue 3G (made by Hoechst), Estrole Brill Blue N-3RL (made by Sumitomo Chemical), Sumi Acryl Blue F-GSL (made by Sumitomo Chemical), D&C Blue No. 1 (made by National Aniline), Spirit Blue (made by Hodogaya Chemical), Oil Blue No. 603 (made by Orient Chemical Industries), Kitone Blue A (made by Ciba Geigy), Aizen Catiron Blue GLH (made by Hodogaya Chemical), Lake Blue A, F, H (made by Kyowa Sangyo), Loadaline Blue 6GX (made by Kyowa Sangyo), Brymocyanin 6GX (made by Inabata & Co.), Brill Acid Green 6BH (made by Hodogaya Chemical), Cyanine Blue BNRS (made by Toyo Ink Manufacturing), and Lionole Blue SL (made by Toyo Ink Manufacturing). Typical organic coloring agent of blue to green includes ultramarine blue, cobalt blue, and cerulean blue, chrome oxide, and $TiO_2$—AnO—CoO—NiO type pigment, but not limited thereto.

(Stimulable Phosphor Plate)

Next, the stimulable phosphor plate to be coated with the protective film and constitute the radiation image conversion panel is described hereunder.

In the radiation image conversion panel of the present invention, various types of polymers are used as the substrate for the stimulable phosphor plate. Particularly in view of handing as a data recording material, one that can be processed in flexible sheet for or web form is preferred. In this sense, plastic film such as cellulose acetate film, polyester film, polyethylene terephthalate film, polyethylene naphthalate film, polyamide film, polyimide film, triacetate film, and polycarbonate film is preferred.

Thickness of the substrate depends upon the material used as the substrate but is normally 80 µm to 1000 µm, and in view of handling, 80 µm to 500 µm further preferable.

The surface of the substrate can be either smooth or matted so as to improve the bonding capability with the stimulable phosphor layer.

In addition, in order to improve the bonding capability with the stimulable phosphor layer, an under layer may be provided under the stimulable phosphor layer.

(Stimulable Phosphor Layer Formed by a Coating Method)

Typical binder (also called as binding agent) used for the stimulable phosphor layer of the present invention includes protein such as gelatin, polysaccharide such as dextran, or natural polymer material such as gum Arabic; as well as synthetic polymer material such as polyvinyl butyral, polyvinyl acetate, nitrocellulose, ethyl cellulose, vinylidene chloride, vinyl chloride copolymer, polyalkyl (metha) acrylate, vinyl chloride/vinyl acetate copolymer, polyurethane, cellulose acetate butyrate, polyvinyl alcohol, and linear polyester.

Of the above binders, particularly preferable ones are a mixture of nitro cellulose, linear polyester, polyacryl (metha) acrylate, or nitro cellulose with linear polyester, mixture of nitro cellulose and polyalkyl (metha) acrylate, and mixture of polyurethane and poly vinyl butyral. These binders may be ones bridged by bridging agent. The stimulable phosphor layer can be formed on a primer layer by a method below.

To begin with, stimulable phosphor and binder are added to a suitable solvent and then mixed thoroughly so as to prepare coating solution where, grains of the stimulable phosphor and compound are dispersed evenly in the binder solution.

Generally, 0.01 to 1 weight unit of binder is used for 1 weight unit of the stimulable phosphor. In view of the sensitivity and sharpness of the radiation image conversion panel to be produced, however, use of less binder is preferable and accordingly, considering the ease of coating, using the binder in a range of 0.03 to 0.2 weight unit is further preferable.

The coated type phosphor layer consists mainly of phosphor grains and polymer resin and is formed and coated on the substrate by a coating machine.

The stimulable phosphor used in the stimulable phosphor layer is normally such that emits stimulable light of a wavelength ranging from 300 to 500 nm by the exciting light of a wavelength ranging from 400 to 900 nm.

Typical phosphors that can be preferably used in the coated type stimulable phosphor layer are listed below, but the present invention is not limited thereto.

Rare-earth element activated alkaline-earth metal halide fluoride type phosphor as disclosed in JP-A No. 55-12145 (1980); rare-earth element activated rare-earth oxyhalide phosphor as disclosed in JP-A No. 55-12144 (1980); cerium activated trivalent metal oxyhalide phosphor as disclosed in JP-A No. 58-69281 (1983); bismuth activate alkaline metal halide phosphor as disclosed in the Specification of JP-A No. 62-25189 (1987); divalent europium activated alkaline-earth metal halo-phosphate phosphor as disclosed in JP-A No. 60-141783 (1985); cerium activated rare-earth composite halide phosphor as disclosed in JP-A No. 61-21173 (1986); divalent europium activated halide cesium/rubidium phosphate as disclosed in the Specification of JP-A No. 61-236888 (1986); and divalent europium activated complex halide phosphor as disclosed in JP-A No. 61-236890 (1986) are typical ones and also each phosphor as disclosed in JP-A Nos. 55-160078 (1980), 56-116777 (1981), 57-23673 (1982), 57-23675 (1982), 58-206678 (1983), 59-27980 (1984), 59-56480 (1984), 60-101173 (1985), 61-23679 (1986), 60-84381 (1985), 60-166379 (1985), 60-221483 (1985), 60-228592 (1985), 61-120883 (1986), 61-120885 (1986), 61-235486 (1986), 60-157099 (1985), 60-157100 (1985), 60-217354 (1980), 61-21182 (1986), and 61-40390 (1986) will do.

Of the stimulable phosphors mentioned above, it is preferred that the stimulable phosphor grain contains iodine and so, for example, divalent europium activated alkaline-earth metal halide fluoride type phosphor containing iodine, divalent europium activated alkaline-earth metal halide type phosphor containing iodine, rare-earth element activated rare-earth oxyhalide type phosphor containing iodine, and bismuth activate alkaline metal halide type phosphor containing iodine are preferred because they cause high luminance stimulable light emission. It is particularly preferred that the stimulable phosphor is BaFI compound added with Eu.

Typical solvent used for preparing the solution to be coated on the stimulable phosphor layer is lower alcohol such as methanol, ethanol, isopropanol, and n-butanol; ketone such as acetone, methyl-ethyl ketone, methyl-isobutyl ketone, and cyclo-hexanone; ester of lower alcohol and lower fatty acid such as methyl acetate, ethyl acetate, and acetate n-butyl; ether such as dioxane, ethylene glycol monoethyl ether, and ethylene-glycol monomethyl ether; aromatic compound such as triol and xylol; halogenized hydrocarbon such as methylene chloride and ethylene chloride; and mixture thereof.

The coating solution may be mixed with various types of additives such as dispersing agent for enhancing the dispersion of the phosphor in the coating solution and plasticizer for enhancing the binding force between the binder and phosphor in the formed stimulable phosphor layer. Typical dispersing agent for the above purpose includes phthalic acid, stealic acid, kaplon acid, and lipophilic surface active agent. Typical plasticizer includes ester phosphate such as triphenyl phosphate, tricresyl phosphate, and diphenyl phosphate; ester phthalate such as diethyl phthalate and dimetoxy ethyl phthalate; glycolic acid ester such as glycolic acid ethyl phthalyl ethyl and glycolic acid butyl phthalyl butyl; and polyester of polyethylene glycol and fatty group dibasic acid such as polyester of triethylene glycol and adipic acid and polyester of diethylene glycol and succinic acid.

The mixture ratio of the bonder and stimulable phosphor in the coating solution depends upon the Haze ratio setting of the required radiation image conversion panel, but is preferably 1 to 20 weight unit for the phosphor and more preferably 2 to 10 weight unit.

The coating solution prepared as above is than applied evenly on the primer layer to form a coating of the coating solution. This coating process can be finished by doctor blade, roll coater, or knife coater.

Then, the formed coating is heated gradually to dry and forming the stimulable phosphor layer on the primer layer is complete. The thickness of the stimulable phosphor layer depends upon the characteristic of the required radiographic image transforming panel, type of stimulable phosphor, and mixture ration of binder and phosphor, but is 20 μm to 500 μm normally. However, the total thickness shall preferably be 50 μm to 3 mm.

The coating solution for the stimulable phosphor layer is prepared using a dispersing device such as ball mill, sand mill, atrighter, 3-roll mill, high-speed impeller disperser, Kady mill, or supersonic disperser. The prepared coating solution is then applied on the substrate by doctor blade, roll coater or knife coater, and the stimulable phosphor layer is formed after the coated solution is dried.

(Stimulable Phosphor Layer Formed by a Vapor Deposition Method)

As a stimulable phosphor for a stimulable phosphor layer formed by a vapor deposition method, for example, a halide phosphor disclosed in JP-A No. 61-236890 and a rare-earth element activated rare-earth oxyhalide-based phosphor containing iodine are listed. Examples of a stimulable phosphor to be used preferably for the radiation image conversion panel of the present invention include, for example, a phosphor that is described in JP-A No. 48-80487 and is expressed with $BaSO_4$:Ax, a phosphor that is described in JP-A No. 48-80488 and is expressed with $MgSO_4$:Ax, a phosphor that is described in JP-A No. 48-80489 and is expressed with $SrSO_4$:Ax, a phosphor wherein at least one type of Mn, Dy and Tb is added to $Na_2So_4$, $CaSo_4$ and $BaSo_4$ described in JP-A No. 51-29889, a phosphor such as BeO, LiF, $MgSO_4$ and $CaF_2$ described in JP-A No. 52-30487, a phosphor such as $Li_2B_4O_7$:Cu and Ag described in JP-A No. 53-39277, a phosphor such as $Li_2O.(Be_2O_2)x$:Cu and Ag described in JP-A No. 54-47883, and a phosphor expressed with SrS:Ce, Sm, SrS:Eu, Sm, $La_2O_2S$:Eu, Sm and (Zn, Cd) S:Mnx described in U.S. Pat. No. 3,859,527. There are also given ZnS:Cu, Pb phosphors described in JP-A No. 55-12142, barium aluminate phosphor whose general formula is expressed by $BaO.xAl_2O_3$:Eu and alkaline earth metal silicate type phosphor whose general formula is expressed by $M(II)O.xSiO_2$:A.

Further, preferable phosphors include alkaline earth fluoride halide type phosphor expressed by the general formula of $(Ba_{1-x-y}Mg_xCa_y)$ $F_x$:$Eu^{2+}$ described in JP-A No. 55-12143, a phosphor expressed by the general formula of LnOX:xA described in JP-A No. 55-12144, a phosphor expressed by general formula of $(Ba_{1-x}M(II)_x)$ Fx:yA described in JP-A No. 55-12145, a phosphor expressed by general formula of BaFX:xCe, yA described in JP-A No. 55-84389, rare-earth element activated divalent metal fluoro-halide phosphor expressed by general formula of M(II) FX.xA:yLn described in JP-A No. 55-160078, a phosphor expressed by general formula of ZnS:A, CdS:A, (Zn, Cd) S:A, X, a phosphor expressed by either one of the following general formulas $xM_3$ $(PO_4)_2.NX_2$:yA and $xM_3$ $(PO_4)_2$:yA described in JP-A No. 59-38278, a phosphor expressed by either one of the following general formulas $nReX_3.mAX'_2$:xEu and $nReX_3.mAX'_2$:xEu, nSm described in JP-A No. 59-155487, and a bismuth phosphor expressed by general formula of M (I) X:xBi described in JP-A No. 61-228400.

Incidentally, alkali halide type stimulable phosphors which are described in JP-A No. 61-72087 and JP-A No. 2-58000 and are expressed by following General Formula (1) are especially preferable.

$$M^1X.aM^2X'_2.bM^3X''_3:eA \qquad \text{Formula (1)}$$

In the formula, $M^1$ represents at least one kind of alkali metal selected from Li, Na, K, Rb and Cs, $M^2$ represents at least one kind of bivalent metal selected from a group of Be, Mg, Ca, Sr, Ba, Zn, Cd, Cu and Ni, $M^3$ represents at least one kind of trivalent metal selected from a group of Sc, Y, La, Ce, Pr, Nd, Pm, Sm, Eu, Gd, Tb, Dy, Ho, Er, Tm, Yb, Lu, Al, Ga and In, each of X, X' and X" is at least one kind of halogen selected from a group of F, Cl, Br and I, "A" represents at least one kind of metal selected from a group of Eu, Tb, In, Ga, Cs, Ce, Tm, Dy, Pr, Ho, Nd, Yb, Er, Gd, Lu, Sm, Y, Tl, Na, Ag, Cu and Mg, and a, b and e respectively show numerical values in ranges respectively of $0 \leq a < 0.5$, $0 \leq b < 0.5$ and $0 < e \leq 0.2$.

In General Formula (1), it is preferable that $M^1$ is selected from a group including K and Rb and it is preferable that X is selected from a group including Br and I.

Further, $M^2$ is preferably selected from a group including Mg, Ca and Sr, while, $M^3$ is preferably selected from a group including Y, Ce, Sm, Eu, Al, La, Gd, Lu, Ga and In. Furthermore, b preferably satisfies $0 \leq b \leq 0.01$, and "A" is preferably selected from a group including Eu, Cs, Sm, Tl and Na.

When these alkali-halide-based stimulable phosphors are formed on the substrate by a vapor deposition method, a slender and columnar crystal that is inclined at a certain angle from a direction of a normal on the substrate (the crystal may also be perpendicular to the substrate surface without being inclined) is formed. Forming of such columnar crystals may control diffusion of the stimulation excited light (and photo-stimulated luminescence) to the lateral direction, whereby, sharpness of images by photo-stimulated luminescence is excellent, which is a special feature in the case of using these phosphors. Among these alkali-halide-based stimulable phosphors, RbBr-based and CsBr-based phosphors are preferable because of high luminance and high image quality.

Phosphors which are especially preferable among phosphors in the present invention are those expressed by the following Formula (2).

$$CsX:A \qquad \text{Formula (2)}$$

In the formula, X represents Br or I, and A represents In, Ga or Ce.

Among others, CsBr-based phosphors are especially high in luminance and image quality, and an effect of improvement of the substrate by a manufacturing method of the present invention or of adhesion (adhesive property) with the substrate is high, which is preferable.

The columnar crystals which are preferable in the present invention and are obtained by the use of these stimulable phosphors, namely, the crystals each has grown to be columnar at intervals can be obtained by the method described in JP-A No. 2-58000 stated above.

That is, the stimulable phosphor layer composed of independent, slender and columnar crystals, can be obtained by a method to supply vapor of stimulable phosphors or their raw materials onto a substrate, and thereby, to make them to grow (to be deposited).

For example, it is possible to obtain columnar crystals which are substantially perpendicular to the surface of the substrate, by making a vapor flow of stimulable phosphor, in the case of deposition, to enter at an angular range of 0-5 degrees from the direction perpendicular to the substrate.

In these occasions, it is appropriate that a space of the shortest portion between the substrate and the crucible is set to about 10-60 cm in accordance with the mean flying distance of the stimulable phosphor.

Stimulable phosphors representing an evaporation source are melted evenly or formed by press or hot press to be precipitated in a crucible. In this case, degassing is preferably carried out. In the method to evaporate stimulable phosphors from the evaporation source, scanning is conducted by an electron beam emitted from an electron gun. It is also possible to evaporate in other methods.

The evaporation source does not always need to be a stimulable phosphor, but it may also be one wherein raw materials of stimulable phosphors are mixed.

Further, with respect to activators, basic substances may either be deposited with those wherein activators are mixed, or, activators may be doped after the basic substance only is subjected to deposition. For example, when the basic substance is CsBr, In representing an activator, for example, may be doped after only CsBr is subjected to deposition. Namely, the reason for the foregoing is that doping can be sufficiently conducted even when the film is thick because the crystals are independent, and crystal growth hardly takes place and the MTF is not lowered.

Concerning the doping, heat diffusion and an ion injection method can be used to inject doping agents (activators) into the formed basic substance layer of phosphors.

(Phosphor Layer Thickness and Crystal Size)

It is preferable that the layer thickness of the stimulable phosphor layer composed of columnar crystals formed in the aforesaid methods is selected from the range of 50-1000 μm, though the thickness may vary depending on the sensitivity of the aimed radiation image conversion panel for the radiation and on the types of stimulable phosphors, and it is more preferable that the layer thickness is selected from the range of 50-800 μm.

For improving the modulation transfer function (MTF) in the stimulable phosphor layer composed of these columnar crystals, the size of the columnar crystal (mean value of a diameter converted from an area of the cross section of each columnar crystal when the columnar crystal is viewed from the surface that is in parallel with the substrate, and it is calculated from a micrograph including at least 100 or more columnar crystals in the field of view) is preferably about 0.5-50 μm but is more preferably 0.5-20 μm. Namely, when the columnar crystal is thinner than 0.5 μm, stimulation excited light is scattered by the columnar crystal and MTF is lowered accordingly, while, when the columnar crystal is thicker than 50 μm, directivity of stimulation excited light is deteriorated and MTF is also lowered.

As a method of a vapor growth (deposition) of the stimulable phosphor, there are given a vacuum evaporation method, a sputtering method and a CVD method.

In the vacuum evaporation method, after the substrate (support) is placed into the vacuum evaporation apparatus, air in the apparatus is exhausted and inert gas such as nitrogen is introduced simultaneously through an introduction inlet to generate a vacuum of about $1.333$ Pa–$1.33 \times 10^{-3}$ Pa. Then, at least one of stimulable phosphors is heated and evaporated in the resistance-heating method or an electron beam method, so that the stimulable phosphor is deposited on the surface of the substrate to the desired thickness. As a result, a stimulable phosphor layer containing no binder is formed, but in the vacuum evaporation process stated above, it is also possible to form the stimulable phosphor layer by dividing into plural processes. Further, in the vacuum evaporation process, a plurality of resistance-heating devices or of electron beams can also be used for vacuum evaporation. In addition, in the vacuum evaporation method, it is also possible to deposit stimulable phosphor raw materials by using plural resistance-heating devices or electron beams, and thereby to compound a targeted stimulable phosphor on the substrate and to simultaneously form the stimulable phosphor layer. Furthermore, in the vacuum evaporation method, the substrate (support) may be cooled or heated in the course of vacuum evaporation, as occasion demands. The stimulable phosphor layer may further be subjected to hot processing, after completion of vacuum evaporation.

In the sputtering method, after the substrate (support) is placed into the sputtering apparatus, air in the apparatus is exhausted to generate a vacuum, after which, inert gas such as Ar or Ne is introduced in the apparatus as gas for sputtering to generate a gas pressure of about $1.33$ Pa–$1.33 \times 10^{-3}$ Pa, which is the same as in the vacuum evaporation method mentioned above. Next, with the target of the aforesaid stimulable phosphor, sputtering is conducted so that the stimulable phosphor is deposited onto the surface of the substrate to the desired thickness. In this sputtering process, it is also possible to form the stimulable phosphor layer by dividing it into plural steps, in the same way as in the vacuum evaporation method, or, it is possible to form the stimulable phosphor layer by using each of them simultaneously or in succession, and thereby, by sputtering against the target. Further, in the sputtering method, plural stimulable phosphor materials can be used as a target, and a targeted stimulable phosphor layer can be formed on the substrate by sputtering the stimulable phosphor materials simultaneously or in succession, or, in case of need, gas such as $O_2$ or $H_2$ can be introduced for conducting reactive sputtering. In addition, in the sputtering method, the substrate may be cooled or heated in the course of sputtering, as occasion demands. The stimulable phosphor layer may further be subjected to hot processing, after completion of sputtering.

The CVD method is one to obtain a stimulable phosphor layer containing no binder on the substrate, by decomposing organic metal compounds containing targeted stimulable phosphors, or stimulable phosphor materials, with energy such as high-frequency power, and in either case, the stimulable phosphor layer can be made to grow on a gas phase basis to be independent slender and columnar crystals that are at a specific angle to the direction of a normal line on the substrate.

These columnar crystals can be obtained by the method described in JP-A No. 2-58000 as stated above, namely, by a method wherein vapor of a stimulable phosphor, or its material is supplied onto the substrate for vapor growth (deposition) such as vacuum evaporation.

Figure 2:
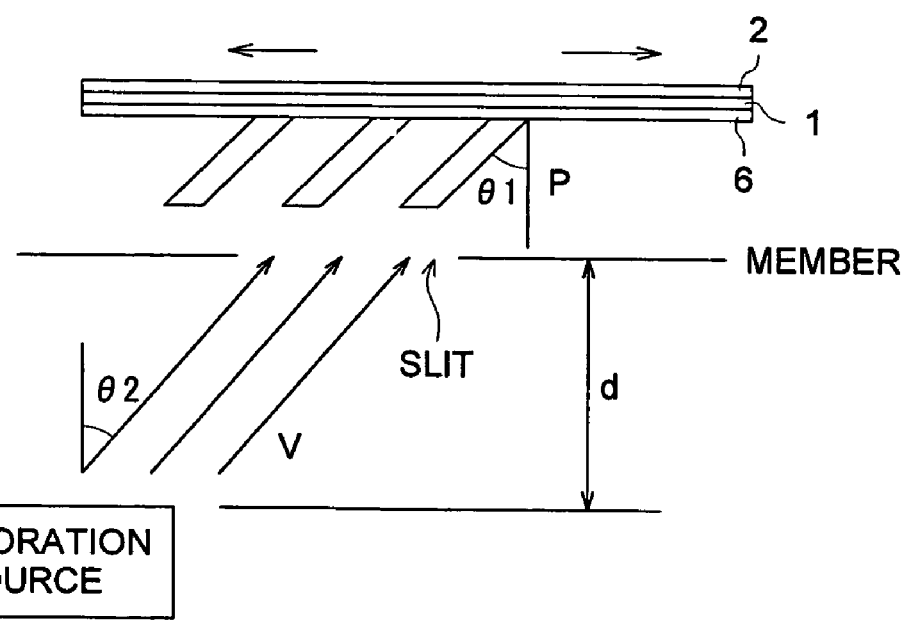
FIG. 2 is a schematic diagram showing how a stimulable phosphor layer is formed on a substrate through vapor deposition.

FIG. 2 is a schematic diagram showing how a stimulable phosphor layer is formed on substrate 2 through vacuum evaporation. Numeral 1 indicates schematically the stimulable phosphor layer composed of stimulable phosphor columnar crystals to be formed and 6 indicates a protective layer. When $\theta 2$ represents the angle of incidence of vapor flow V of stimulable phosphor for the direction (P) of a normal line on a surface of the substrate, the angle of the columnar crystal to be formed for the direction (P) of a normal line on a surface of the substrate is represented by θ1. Columnar crystals are formed at certain angle θ1, depending on the angle of incidence θ2. The angle of the formed columnar crystal varies depending on the material of the stimulable phosphor, and in the case of CsBr-based phosphor which is especially preferable in the present invention among phosphors of alkali halide type, for example, it is possible to obtain a columnar crystal that is substantially perpendicular to the surface of the substrate (θ1 in is close to 0°), by making the vapor flow of stimulable phosphor in the course of vacuum evaporation to enter within a range of 0-5° (namely, θ2 is 0-5°) for the direction perpendicular to the substrate, for example.

Stimulable phosphor layer 1 formed on the substrate in the foregoing manner is excellent in directivity because no binder is contained, and directivity for stimulation excited light and photo-stimulated luminescence is high, and a layer thickness can be made thicker than that of a radiation image conversion panel having a dispersion type stimulable phosphor layer where stimulable phosphors are dispersed in the binder. Still further, image sharpness is improved by the reduction of scattering of the stimulation excited light in the stimulable phosphor layer.

Further, fillers, such as binders, may be filled in a gap between columnar crystals, and they may serve as reinforcement for the stimulable phosphor layer. Substances having high light absorptance or substances having high light reflectance may further be filled. Owing to this, a reinforcement effect can be provided, and light scattering in the lateral direction of the stimulation excited light entered the stimulable phosphor layer can be prevented almost perfectly.

The substance having high light reflectance is one having high reflectance for stimulation excited light (500-900 nm, especially 600-800 nm), and a white pigment and coloring agents covering areas from green to red such as, for example, aluminum, magnesium, silver, indium and other metals can be used.

A white pigment can reflect also photo-stimulated luminescence. As a white pigment, there are given $TiO_2$ (anatase type, rutile), MgO, $PbCO_3 \cdot Pb(OH)_2$, $BaSO_4$, $Al_2O_3$, M (II) FX (where, M (II) is at least one type of Ba, Sr and Ca, and X is at least one type of Cl and Br), $CaCO_3$, ZnO, $Sb_2O_3$, $SiO_2$, $ZrO_2$, lithophone ($BaSO_4 \cdot ZnS$), magnesium silicate, basic lead sulfate, basic lead phosphate and aluminum silicate. These white pigments are strong in terms of covering power and also great in terms of refractive index, thus, they scatter photo-stimulated luminescence easily by reflecting or refracting light, and improves remarkably sensitivity of the radiation image conversion panel obtained.

Further, as a substances having high light absorptance, there are used, for example, carbon, chromium oxide, nickel oxide, iron oxide and blue coloring agents. Among these, carbon absorbs also photo-stimulated luminescence.

Coloring agents may either be of organic or of inorganic which are common to those described above for blue to green coloring agents. Organometal complex coloring agents of Color Index Nos. 24411, 23160, 74180, 74200, 22880, 23154, 23155, 24401, 14830, 15050, 15760, 15707, 17941, 74220, 13425, 13361, 13420, 11836, 74140, 74380, 74350 and 74460 are also applicable.

The formed stimulable phosphor plate provided with the phosphor layer on the substrate is then cut to a specified size. Any cutting means is applicable but, in view of workability and accuracy, use of trimming machine or punching machine is preferred.

After the formed stimulable phosphor plate provided with the stimulable phosphor layer on the substrate is cut to a specified size, the protective film is put on both top and rear surfaces of the stimulable phosphor plate so that the peripheral areas of the protective film are positioned outside the peripheral areas of the stimulable phosphor plate as shown in FIG. 1, and then the top and rear moisture-proof protective films are fused together or bonded with adhesive in an area outside the peripheral areas of the stimulable phosphor plate. Thus, the radiation image conversion panel of the present invention having an enclosed construction is produced.

(Radiation Image Conversion Panel of 2 mm or Less)

In the inventions described in Items (10)-(14), the thickness of the stimulable phosphor plate is 2 mm or less, which prevents that creases and waves are caused on each of the first and second moisture-proof protective films. Therefore, it is possible to prevent in advance a phenomenon that streaks and unevenness are caused on radiation images, and to prevent beforehand that moisture-proof ability for the stimulable phosphor layer and flatness of the radiation detection surface of the stimulable phosphor plate are deteriorated.

Preferred method for preparing a radiation image conversion panel free from creases and waves will be explained as follows, referring to the drawings. However, a scope of the present invention is not limited to the illustrated examples.

Figure 3:
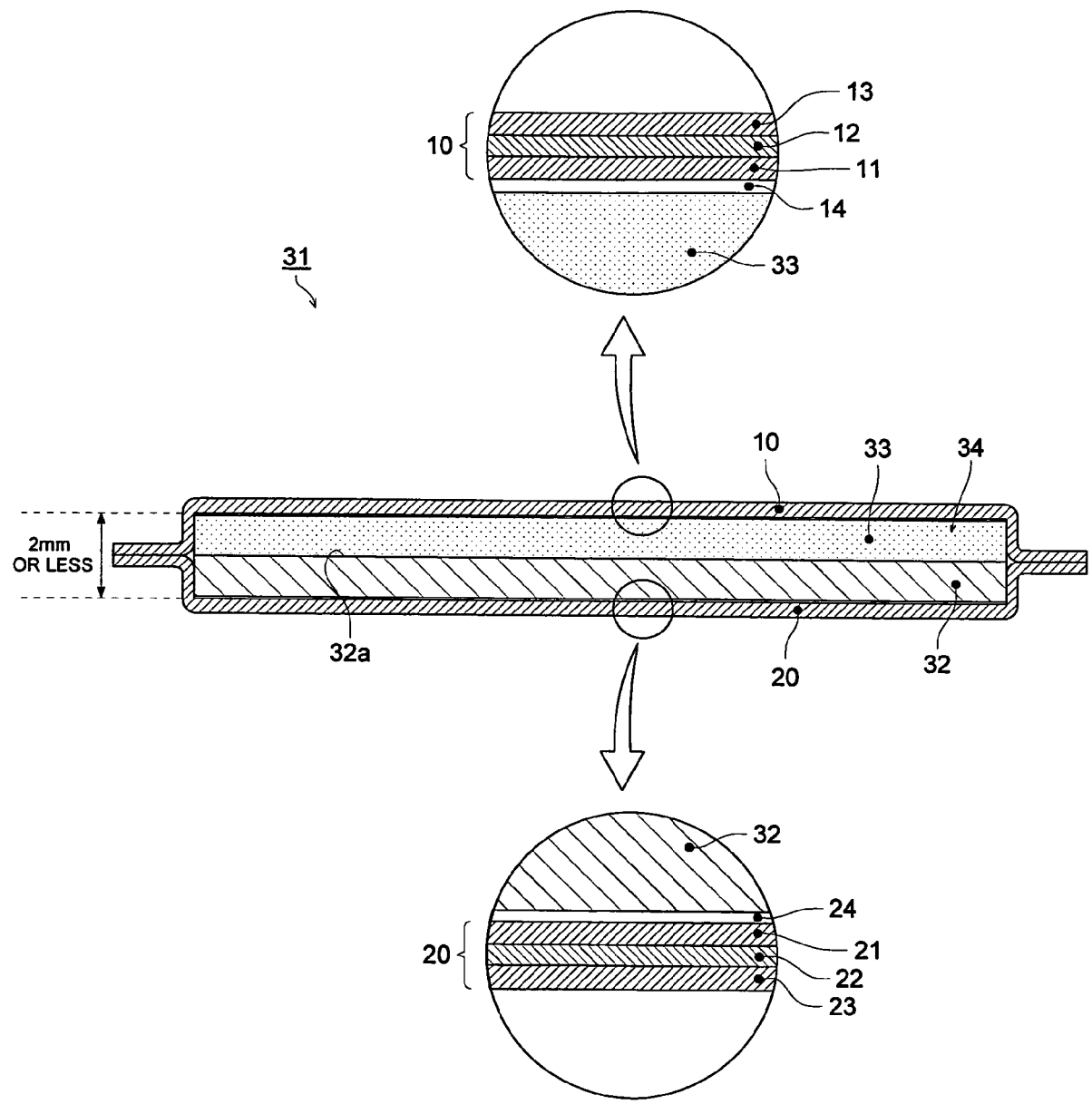
FIG. 3 is a sectional view of a radiation image conversion panel of one of the aspects of the present invention.

FIG. 3 is a sectional view of radiation image conversion panel 31.

Radiation image conversion panel 31 relating to the present invention has stimulable phosphor plate 34 wherein stimulable phosphor layer 33 is formed on prescribed substrate 32. In FIG. 3, 34 indicates a laminated layer of stimulable phosphor layer 33 and substrate 32

Substrate 32 is in the form of a rectangle, and is made of various polymer materials, glass or metal, and it is particularly preferable that the substrate is made of a material capable of being processed into a flexible sheet or a web that is easily handled as an information recording material. From the viewpoint mentioned above, it is preferable that a plastic film such as cellulose acetate film, polyester film, polyethylene terephthalate, polyamide film, polyimide film, triacetate film and polycarbonate film, a sheet of metal such as of aluminum, iron, copper, or a metal sheet having a covering layer made of oxides of the aforesaid metals are used to form the substrate.

Surface 32a of substrate 32 (an upper surface in FIG. 3) may be either a smooth surface or a matte surface for the purpose of improving the property of adhesion to stimulable phosphor layer 33, and a subbing layer may also be provided on surface 32a for the purpose of improving the property of adhesion onto stimulable phosphor layer 33.

Stimulable phosphor layer 33 is a layer that is made up of a widely known stimulable phosphor, and is formed through a known vapor deposition method. The stimulable phosphor layer 33 may be composed either of a single layer or of two or more layers.

In stimulable phosphor plate 34, the thickness of the substrate is 0.2 mm or more, the thickness of the stimulable phosphor layer 33 is 1.8 mm or less, and the total of the thickness of the substrate 32 and that of the stimulable phosphor layer 33 is 2 mm or less.

Stimulable phosphor plate 34 featuring the aforesaid structure lies between first moisture-proof protective film 10 arranged on stimulable phosphor layer 33 and second moisture-proof protective film 20 arranged under the substrate, as shown in FIG. 3.

First moisture-proof protective film 10 has an area that is slightly greater than stimulable phosphor plate 34, and the peripheral areas of first moisture-proof protective film 10 are extended to the outside of peripheral areas of the stimulable phosphor plate 34, under the condition that first moisture-proof protective film 10 is not adhered to stimulable phosphor layer 33 of stimulable phosphor plate 34. "The condition under which first moisture-proof protective film 10 is not substantially adhered to stimulable phosphor layer 33 means a state where first moisture-proof protective film 10 is not optically integrated with stimulable phosphor layer 33, and it specifically means the state where the area of contact between first moisture-proof protective film 10 and stimulable phosphor layer 33 is 10% or less of the area of the surface (facing first moisture-proof protective film 10) of stimulable phosphor layer 33.

On the other hand, second moisture-proof protective film 20 also has an area that is slightly greater than stimulable phosphor plate 34, and its peripheral areas also extend to the outside of peripheral areas of stimulable phosphor plate 34.

In radiation image conversion panel 31, peripheral areas of first moisture-proof protective film 10 and those of second moisture-proof protective film 20 are fuse to each other along the entire circumference, thus, radiation image conversion panel 31 has a structure to seal stimulable phosphor plate 34 completely with first and second moisture-proof protective films 10 and 20. The first and second moisture-proof protective films 10 and 20 are structured to protect the stimulable phosphor plate 34 by sealing it and by surely preventing moisture from entering the stimulable phosphor plate 34.

As shown in the enlarged diagram at the upper part in FIG. 3, first moisture-proof protective film 10 has a laminating structure wherein three layers including the first, second and third layers 11, 12 and 13 are laminated.

First layer 11 faces stimulable phosphor layer 33 of stimulable phosphor plate 34 through air layer 14, and is made of a heat sealable resin. As "resin having heat sealing property", there are given ethylene-vinyl acetate copolymer (EVA), casting polypropylene (CPP) and polyethylene (PE).

Second layer 12 is a layer made of metal oxide such as alumina or silica, and it is vapor-deposited under third layer 13 through a common vacuum evaporation method. Second layer 12 is one for strengthening moisture-proof ability of first moisture-proof protective film 10, but it is not always needed.

Third layer 13 is laminated onto the second layer 12, and is made of resin such as polyethyleneterephthalate (PET).

First moisture-proof protective film 10 having therein second layer 12 which is made of metal oxide is excellent in terms of processability and transparency, and it is hardly affected by temperature and humidity on the aspect of moisture-resistance and oxygen transmission. Therefore, the first moisture-proof protective film 10 is fitted to radiation image conversion panel 31 for medical use of a type to employ a stimulable phosphor which is required to offer stable image quality, independently of environmental conditions.

Incidentally, one or more layers which are the same as the first layer 11, or second layer 12, or third layer 13, or which are made up of resins different from those of the first and third layers 11 and 13 may be laminated onto the third layer 13.

In particular, when a layer identical to second layer 12 that is made up of metal oxide such as alumina or silica is laminated onto third layer 13, first moisture-proof protective film 11 displays optimum moisture-resistance that is in accordance with the number of laminated layers each corresponding to its second layer 12. As a method of lamination for second layer 12 or for a layer equal to the second layer, any method can be applied if it is a common method, but it is preferable, from the viewpoint of workability, to employ the method complying with a dry lamination system.

Further, by employing a layer structure wherein the distance (thickness of first layer 11) from the lower surface of second layer 12 in FIG. 3 to the surface of first layer 1 (lower surface in FIG. 3) facing stimulable phosphor layer 33 is made to be 35 μm or more, in first moisture-proof protective film 10, damage is reduced on the second layer 12 (metal-oxide-evaporated layer) in the fused portion between first moisture-proof protective film 10 and second moisture-proof protective film 20.

In addition, by laminating first, second and third layers 11, 12 and 13 so that the haze value is less than 5%, in first moisture-proof protective film 10, it is possible to obtain images having less image noise and excellent sharpness, from radiation image conversion panel 31. Though the reason for the foregoing is not clear, it is assumed that scattered light, caused by a density difference of the first moisture-proof protective film 10 or by microscopic defects in the first moisture-proof protective film 10, is confined to the inside of first moisture-proof protective film 10 in the state of the so-called total reflection, to be attenuated, and thus, the image noise is hardly generated.

As shown in the enlarged diagram at the lower part in FIG. 3, second moisture-proof protective film 20 has a laminating structure wherein three layers, including first, second and third layers 21, 22 and 23 respectively are laminated.

First layer 21 faces substrate 32 of stimulable phosphor plate 34 through air layer 24. First layer 21 is made up of the same resin as in the first layer 11 of first moisture-proof protective film 10, and is fused, on its peripheral area, with first layer 11 of first moisture-proof protective film 10.

Second layer 22 is an aluminum layer laminated onto the lower surface of first layer 21. Second layer 22 is one for improving moisture-resistance of second moisture-proof protective film 20, but it is not always needed. From the point of view of deterioration of moisture-resistance caused by pinholes, the thickness of second aluminum layer 22 is preferably 9 μm or more.

Third layer 23 is laminated onto the lower surface of the second layer 22, and it is made of resin such as PET.

Incidentally, one or more layers which are the same as first layer 21, or second layer 22, or third layer 23, or which are made up of resins different from those of the first and third layers, 11 and 13 may be laminated onto the lower surface of third layer 23.

A method of manufacturing radiation image conversion panel 31 will now be explained as follows.

Stimulable phosphor layer 33 having a thickness of 1.8 mm or less is first formed on prescribed substrate 32 having a thickness of 0.2 mm or more through a vapor deposition method. In this case, stimulable phosphor layer 33 is formed so that the total thickness of substrate 32 and of the stimulable phosphor layer 33 may be 2 mm or less.

After stimulable phosphor layer 33 is formed on substrate 32, substrate 32 is cut to the prescribed size to prepare stimulable phosphor plate 34. For cutting substrate 32, any cutting method may be employed if it is an ordinary cutting method, but it is preferable to use a trimming machine or punching machine, from a viewpoint of workability and precision.

After making stimulable phosphor plate 34, it is interposed between first moisture-proof protective film 10 and second moisture-proof protective film 20, after which, a peripheral area of first moisture-proof protective film 10 and that of second moisture-proof protective film 20 are heated and fused by an impulse heat sealer while the aforesaid state is maintained, whereby, stimulable phosphor plate 34 is sealed by first moisture-proof protective film 10 and second moisture-proof protective film 20. It is preferable that heating and fusing by the impulse heat sealer are conducted under a decompressed environment, and in this case, it is possible to prevent that stimulable phosphor plate 34 is shifted from the desired position in first and second moisture-proof protective films 10 and 20, and moisture in the first and second moisture-proof protective films 10 and 20 can be removed.

Incidentally, the sealing process for stimulable phosphor plate 34 can also be conducted by a laminating method wherein stimulable phosphor plate 34 interposed between the first and second moisture-proof protective films 10 and 20 is fed into two heated rollers to be heated and pressed together with the first and second moisture-proof protective films 10 and 20, while the state of the interposition of the stimulable phosphor plate 34 is maintained. In this case, it is necessary to adjust the heating temperature of the rollers and the nip pressure between the rollers, because only the peripheral areas of first and second moisture-proof protective films 10 and 20 are to be fused, without substantially adhering first moisture-proof protective film 10 to stimulable phosphor layer 33 of stimulable phosphor plate 34.

In radiation image conversion panel 31, it is possible to prevent that creases and waves are caused on the first and second moisture-proof protective films 10 and 20 during manufacture or after manufacturing, because the thickness of the stimulable phosphor plate 34 is as thin as 2 mm or less. Therefore, it is possible to prevent in advance a phenomenon that streaks and unevenness are caused on radiation images, and to prevent beforehand that moisture-resistance for stimulable phosphor layer 33, and flatness of the radiation detection surface of stimulable phosphor plate 34 are deteriorated.

(Radiation Image Conversion Panel Sealed at Peripferal Area)

In the radiation image conversion panel in which a stimulable phosphor layer is formed on a substrate by a vapor deposition method, the stimulable phosphor layer is highly hygroscopic and is less resistant to moisture, thus, the surface of the stimulable phosphor layer and the substrate are usually covered and integrally sealed by the use of a moisture-proof protective film, or preferably by a film on which metal oxide has been deposited, to obtain a radiation image conversion panel that is highly moisture-resistant.

As stated above, it is commonly known that a stimulable phosphor layer and a substrate are covered and sealed by a moisture-proof protective film, and penetration of moisture is thus prevented, for avoiding deterioration of capability of the radiation image conversion panel caused by moisture absorption of the stimulable phosphor.

For example, in the radiation image conversion panel described in Patent Document 1 (JP-A No. 11-344598), the surface and the rear of the substrate, having thereon a stimulable phosphor layer, are covered by a moisture-proof protective layer composed of a resin film on which a metal oxide is vacuum evaporated, and the periphery is sealed to protect the interior thereof against moisture.

Figure 4:
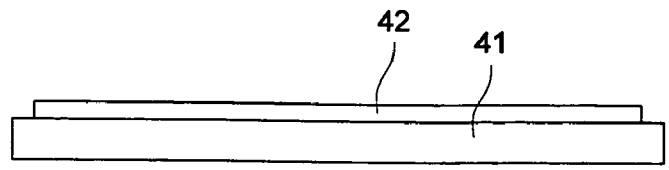
FIG. 4 is a sectional view of a phosphor plate in which a stimulable phosphor layer is formed.

FIG. 4 is a sectional view of a phosphor plate in which stimulable phosphor layer 42 composed of columnar crystals such as CsBr, for example, is formed by a vapor deposition method on substrate 41 representing, for example, a borosilicate glass plate.

Figure 5:
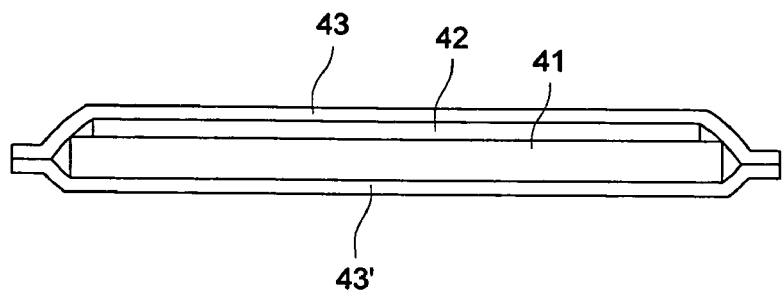
FIG. 5 is a sectional view showing how a stimulable phosphor layer side and a rear side of a stimulable phosphor plate are sealed by moisture-proof films.

FIG. 5 shows a sectional view wherein the phosphor surface and the reverse side of the phosphor plate, composed of stimulable phosphor layer 42 and substrate 41, are respectively covered by moisture-proof films 43 and 43'. These two moisture-proof films are adhered on a heat curing basis, on their peripheral area portions, with thermosetting resins, for example, by urea resin based materials, whereby, the phosphor plate is totally sealed.

The thermosetting resins are those which are hardened when they are heated and to be formed, among synthetic resins, and as specific examples of thermosetting resins of the present invention, there are given, for example, urea resins, silicon resins, epoxy resins and acryl resins, of which urea resins are preferable.

Those which may be used for the moisture-proof protective film include a film on which a foil of metal oxide such as, for example, silica or alumina is deposited (for example, alumina-deposited PET (readily available on the market and made by Toyo Metallizing Co.), or one in which the aforesaid film is multi-laminated with other resin films (for example, the one in which CPP (heat-sealable film (casting polypropylene)) is laminated). Due to the foregoing, it is possible to adhere peripheral peripheral areas of the moisture-proof protective films with thermosetting resins and thereby to seal with the moisture-proof protective films.

Though the methods stated above have desired effects to a certain level, and it is conspicuous in, for example, alkali-halide-based stimulable phosphor that is highly deliquescent, especially, in CsBr-based phosphor and I-based phosphor, it was found that the moisture-proof ability is not sufficient, and the sufficient durable years for photo-stimulated luminescence characteristics are not obtained via the above methods.

The reason for the above is that the deliquence of the stimulable phosphor is high, and thereby deterioration of the photo-stimulated luminescence characteristics of the phosphor caused by moisture absorption is also high. On the other hand, when viewing the above-mentioned methods from the aspect of the sealing method, a substrate having, for example, a thickness that is as small as 500-2000 μm, and a stimulable phosphor layer formed on the substrate by a vapor deposition method are held together between moisture-proof protective films in such a way that the surface of the stimulable phosphor and a reverse side of the substrate may be brought into contact with the moisture-proof protective films, and peripheral areas of the substrate are adhered and sealed by thermosetting adhesive agents. Therefore, creases tend to be formed on the four corners of the peripheral areas of the substrate, due to the thickness of the four corners, and imbalance in adhesion strength between the upper and lower moisture-proof protective films is easily caused. Accordingly, durability is poor and cracks tend to be caused, whereby sufficient sealing strength is not secured.

A means to increase the number of film sheets, each carrying deposited metal oxide such as silica or alumina, for example, or to increase the thickness of the metal oxide film to enhance moisture-resistance in the course of processing the moisture-proof protective film, does not serve as a means for the aforesaid improvement, and further causes deterioration of sharpness, which requires another means to improve moisture-resistance. Further, the surface of a stimulable phosphor columnar crystal formed by a vapor deposition method is not actually smooth, gaps are present among the columnar crystals, and microscopic gaps lie between the moisture-proof protective film and the crystal surface, are factors to cause imbalance in adhesion between the moisture-proof protective films when sealing a thick phosphor plate integrally, and the gaps are considered to be one of the causes for promoting deterioration of performance of a radiation image conversion panel gradually.

Therefore, the present invention provides a new sealing method for stimulable phosphor plates that can effectively seal only the stimulable phosphor layer, independently of the thickness of the substrate, when sealing a substrate (stimulable phosphor plate) in which a stimulable phosphor layer by a film (moisture-proof protective film) on which metal oxide is deposited, is formed. Though the thickness of the stimulable phosphor layer is within the range of 50-1000 μm, which is relatively thick from the requirement of sensitivity, the thickness of the substrate is further greater (many of them reach 400-2000 μm, generation of creases on a moisture-proof film, especially on four corners of the phosphor plate caused by the thickness of the substrate is less, and firm sealing with strong adhesion strength can be attained.

Figure 6:
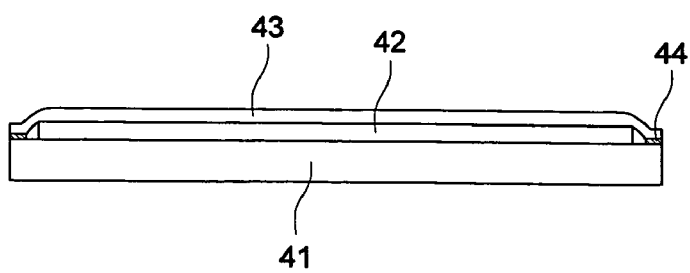
FIG. 6 is a sectional view showing an example of a radiation image conversion panel of the present invention.

FIG. 6 shows an example of a radiation image conversion panel of the present invention. This radiation image conversion panel is formed by superposing moisture-proof protective film 43 on the surface, having thereon a stimulable phosphor layer of stimulable phosphor plate having, on its substrate 41, at least one stimulable phosphor layer 42 formed by a vapor deposition method, and by adhering and sealing peripheral areas of the substrate where the stimulable phosphor layer is not formed with adhesive agents 44.

In the conventional method to stick and seal the entire substrate, having thereon a stimulable phosphor layer, with moisture-proof protective films, creases are easily generated on the peripheral areas of the moisture-proof protective films, especially on the portions near four corners, because the thickness of the substrate and that of the phosphor layer are large, whereby, sealing is not sufficient, stress tends to build up in the phosphor crystal and performances have tended to be deteriorated. In contrast to this, the stimulable phosphor layer only has to be protected in the aforesaid new sealing method, and it is not necessary to seal together with the substrate, and the radiation image conversion panel sealed by this new sealing method is free from creases, especially, on the four corners and from unevenness in adhesion, which is preferable.

As adhesives for sticking both moisture-proof protective films in this method, adhesives employing the thermosetting resins can be used. Owing to this, it is possible to heat the portion of adhesives after sticking both moisture-proof protective films, and thereby to harden the resins to seal the phosphor layer.

However, what is more preferable in the present invention is to stick the moisture-proof protective film and the phosphor substrate by using heat-sealable resins. Namely, in FIG. 6, adhesive sheet composed of heat-sealable film and an adhesive agent layer (for example, adhesive sheet whose base material is CPP (casting polypropylene)) is pasted on substrate 41 as adhesives 44, in place of adhesives composed of the thermosetting resins, then, moisture-proof protective film 43 stuck to stimulable phosphor layer 42, in which a heat-sealable film is laminated on the surface of the moisture-proof film, is superposed on adhesives 44 so that the heat-sealable film surface may face the heat-sealable film surface stuck to the substrate, and both heat-sealable films are heat-sealed through heat-sealing, which is preferable.

Because of adhesion by means of heat sealing, both layers are fused and highly strong adhesion can be attained. In addition, the effect of the sealing is durable because moisture vapor transmittance of heat-sealable resin such as CPP is low.

Heat sealing is preferably conducted at the temperature within a range of 120-200° C., although the temperature varies depending on a fusing temperature of heat-sealable resins to be used, and it is preferable to use heat-sealable resin film whose heat sealing temperature is in the aforesaid range. In particular, heat-sealable resin whose base material is polypropylene is preferable.

As an adhesive agent layer to be laminated with a heat-sealable film, there is, for example, an acryl-based adhesive agent, and PPS adhesive sheet No. 370 series made by Nitto Denko Co., for example, is a adhesive sheet which is available on the market and has the polypropylene film as the base material and has an adhesive agent layer composed of acryl-based resin.

By using these adhesive sheets, a surface of the heat-sealable film is affixed to the substrate so that it faces the heat-sealable film surface of the moisture-proof protective film, and they are heated to be heat-sealed to each other, to be sealed.

Due to this, a moisture-proof protective film can be affixed directly to the phosphor surface of a thick substrate, whereby, only the phosphor layer the thickness of which is smaller compared to that of the substrate is sealed between the substrate and the moisture-proof protective film, and creases are not caused on the peripheral areas of the sealed portion on the circumference. Since moisture vapor transmittance of heat-sealable resin such as casting polypropylene is low, sealing property against moisture is excellent, and sealing by the moisture-proof protective film is carried out more evenly and firmly on a better tight junction.

As heat-sealable resins, polyethylene terephthalate (PET), polyethylene (PE), low-density polyethylene (LDPE) and casting polypropylene (CPP) can preferably be used.

These heat-sealable resins used in the present invention are those which are heat-sealable at the aforesaid temperature ranging from 130° C. to 200° C., and resins whose heat-fusible temperature mentioned below are in the range of 120-250° C. are preferable.

With respect to measurement of the melting point of resins, materials in a form of a pulverulent body are placed on a stainless steel plate for heating that is temperature-controlled, and a 50 power magnifier is used to measure the softening point and the state of melting by observing the state of softening and melting. Further, there is a method to measure by using DSC. Resin powder is measured after being pulverized to be a particle diameter of about 10 μm.

The melting temperature obtained through the foregoing is 150° C. to 165° C. for polypropylene, and is about 122° C. for polyethylene (LLDPE).

As these heat-sealable resins to be used in the present invention, resins which are heat-sealable, namely, the aforementioned polyethylene and polypropylene are specifically preferable.

It is preferable that heat-sealing is conducted at the temperature which is in the vicinity of the melting temperature stated above or the temperature higher than that, namely, the temperature ranging from 130° C. to 200° C.

Figure 7:
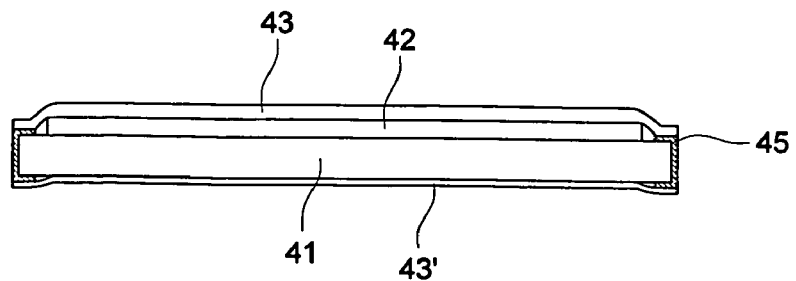
FIG. 7 is a sectional view showing another example of a radiation image conversion panel of the present invention.

FIG. 7 shows an example of a radiation image conversion panel relating to the present invention wherein a stimulable phosphor layer is sealed by the use of a sealing method that is more preferable.

In the structure of the embodiment in FIG. 7, there is stuck adhesive sheet 45 composed of a heat-sealable resin film such as CPP and a layer of adhesives in such a way that the layer of adhesives makes a turn from the phosphor side to the reverse side of the substrate at its end portion, on the circumferential portion of the substrate having no stimulable phosphor layer on the peripheral area of the stimulable phosphor plate, having at least one stimulable phosphor layer 42 formed by a vapor deposition method on the substrate, and the surface of heat-sealable film of each of two moisture-proof protective film sheets 43 and 43' each having heat-sealable film layer equally is heat-sealed with the surface of the heat-sealable film of the adhesive sheet 45 at the peripheral area portion of the substrate, to face the adhesive sheet 45.

In the sealing method having the structure stated above, two moisture-proof protective films and a heat-sealable film, such as CPP are sealed completely to cover the stimulable phosphor plate by heat-sealable resins, whereby, the heat-sealable resins having low moisture transmission such as a polypropylene film seals completely. Thus, compared to the sealing method shown in FIG. 8 where the layer of adhesives such as thermosetting resins transmit moisture slightly, a radiation image conversion panel that is more close to perfect interception of moisture and is highly durable, can be obtained.

When paying attention to improvement for unevenness or imperfection of sealing caused by generation of creases, adhesion between the moisture-proof protective film and the substrate, or adhesion between the moisture-proof protective films does not need to be carried out by using a adhesive sheet composed of the heat-sealable resin film and a layer of adhesives, and it is also possible to obtain its effect sufficiently by using adhesives composed of thermosetting or light-hardenable resins, or a adhesive sheet. When the adhesive sheet that has a heat-sealable resin film such as CPP as a base and has a layer of adhesives, is used in the aforesaid manner, moisture interception and sealing property are improved, in addition to the above-mentioned effect, and durability is made excellent because strength can be maintained even after adhesion by fusion between heat-sealable resins, which is preferable.

The moisture-proof protective film mentioned above is a resin film on which at least one metal oxide layer is deposited, and it is preferably a laminated film wherein a plurality of resin films, including resin films on which metal oxides are deposited, are stuck to be luminous. In particular. In particular, when the adhesive sheet, having the heat-sealable resin film as a base, is used for adhesion by heat-sealing, it is preferable that the surface adhering to the adhesive sheet is a moisture-proof protective film where similar heat-sealable resin films are laminated.

A film (membrane) on which metal oxide is deposited is one wherein at least one layer of metal oxide membrane having a thickness of 1 Å-100 Å is vacuum evaporated on a resin film of 1-30 μm, and for example, it is a resin film such as polyethylene terephthalate (PET) whose moisture-resistance is enhanced by forming an inorganic oxide layer such as silica or alumina through deposition. These are inexpensive and are excellent in processability and transparency, and their moisture-resistance and oxygen transmission are hardly affected by temperature and humidity, thus they are suitable for a moisture-proof protective film of a medical stimulable phosphor plate that is required to have stable image quality independently of environment. Recently, these metalized films can be subjected to retort sterilization, because they are transparent to allow contents to be confirmed, and their thermo-stability is high. Owing to their advantages that their contents can be heated by a microwave oven, they have been popularized in the field of foodstuff, as a substitute for an opaque aluminum laminate film.

As a film metalized with a metal oxide, there is given VMPET as alumina-deposited PET (polyethylene terephthalate), for example, and this is available from Toyo Metalizing Co.

With respect to the film metalized with the metal oxide to be used in the present invention, it is possible to use a film having plural metalized layers, each being different from the others complying with desired moisture-resistance, or it is possible to laminate a plurality of films to further enhance moisture-resistance.

In the present invention, it is preferable that a metalized film is used as a moisture-proof protective film, by laminating two or more kinds of other resin films, each being different in terms of material, for example, by laminating other resin films, such as polyethylene terephthalate, polyethylene naphthalate and nylon, on the aforesaid film metalized with a metal oxide, as a protective layer, or for providing other functions or for enhancing moisture-resistance. A laminating method in this case includes a dry laminating method, an extrusion laminating method or a coextrusion coating laminating method.

Regarding the method to laminate the metalized film and other resin films, the dry laminating method is excellent on the point of workability. In this method, it is general that a hardening layer of adhesives with a thickness of 1.0-2.5 μm is used, but it is necessary to make a thickness of a layer of adhesives to be greater than 2.5 μm. However, when the amount of adhesives to be coated is too large, it is preferable to adjust the amount of adhesives so that a thickness of dried coating may be 3-5 μm, because tunneling, exudation, or reticulation may be caused.

To laminate resin films, a hot-melt laminating method, an extrusion laminating method and a coextrusion laminating method may also be used, and each of them may further be used together with the dry laminating method.

The hot-melt laminating method is one to melt hot-melt adhesives and to coat a layer of adhesives on a substrate, and in the method, the thickness of the layer of adhesives can be set within a range that is as broad as 1-50 μm. As a base resin for hot-melt adhesives used in general, EVA, EEA, polyethylene and butyl rubber are used, while, rosin, xylene resin, terpene-based resin and styrene-based resin are added as an adhesion giving agent, and wax is added as a plasticizing agent.

The extrusion laminating method is one to coat resins melted at high temperature on a substrate with a die, and a resin layer thickness can generally be set in a broad range of 10-50 μm.

As resins used in the extrusion laminating method, LDPE, EVA and PP are generally used, and the base material is sometimes coated with an adhesion promoter in advance to increase adhesion a properly of adhesion to the base material.

The adhesion promoter includes organic titanium-based, polyethyleneimine-based, isocyanate-based and polyester-based adhesion promoters, and each of these adhesion-promoter layers is one to form microscopic irregularities on the surface of the base material film to improve diffusing property of melted polymer, and it is not included in the layer of hardening adhesives with a thickness of not more than 2.5 μm mentioned in the present invention.

The coextrusion laminating method is one to extrude thermoplastic resins in the same type or in the different types from two or more extrusion machines simultaneously, to laminate them inside or outside a specially designed dies, and to form multi-layer films simultaneously with casting.

Resins generally used for the coextrusion laminating method include LDPE (low-density polyethylene), Ny (nylon), ION (ionomer), PP (polypropylene), EVA (ethylenevinylacetate), HDPE (high-density polyethylene), MDPE (medium-density polyethylene), PVDC (polyvinylidene chroride) and POL (polyolefin).

As stated above, in the radiation image conversion panel of the present invention, it is preferable to use a laminated film wherein plural resin films including the film metalized with metal oxide as a moisture-proof protective film, to seal and protect a stimulable phosphor plate against moisture. In the case of a laminated film, a layer of adhesives that joins a film having a layer of metal oxide and another resin film, or joins plural films, each being metalized with metal oxide, has a thickness of 2.5 μm or less, and it is preferable that layers of vinyl-based, acryl-based, polyamide-based, epoxy-based, rubber-based and urethane-based adhesives which are hardening and are accompanied by crosslinking reactions caused by heat or ultraviolet rays, and are of two-solution reaction type for using by mixing main agents and hardening agents specifically or of one-solution type having a reaction group in the molecular structure, are used. These adhesives are generally used frequently in dry lamination.

However, hot-melt type adhesives are not included in layers of hardening adhesives mentioned in the present specification, except those of an aging hardening type.

A practical thickness of these moisture-proof protective films is from 1 μm up to 300 μm. For obtaining excellent moisture-resistance and shock-resistance, 5 μm or more is preferable, and when a moisture-proof protective film with a thickness of 10 μm or more is used for sealing, a conversion panel excellent in durability and service life was obtained, which is more preferable.

However, even in the case of using as a moisture-proof film, on the other hand, it is important not to make a film thickness to be too large, from the point of view of sharpness. When using a film within a range where sharpness is not lowered, the total thickness of the moisture-proof protective film including a film metalized with metal oxide is 300 μm, but preferably, 150 μm or less.

For example, those wherein the moisture-proof film metalized with metal oxide and heat-sealable films of polyethylene terephthalate (PET), polyethylene (PE), low-density polyethylene (LDPE) and casting polypropyrene (CPP) are laminated through dry lamination, can be used practically as a moisture-proof protective film. For melting and joining surfaces of heat-fusible resin films by using a adhesive sheet which is affixed on the substrate having a stimulable phosphor layer and has a base of a heat-sealable resin film, a moisture-proof protective film wherein heat-sealable resin films such as low-density polyethylene (LDPE) and casting polypropyrene (CPP) are laminated to be the outermost layer is preferable.

A adhesive sheet having therein heat-sealable resin film as a base that is joined with a moisture-proof protective film in which the heat-sealable resin film is laminated includes one in which PP (polypropyrene) film is the base material, and there is specifically given PPS adhesive sheet No. 370 series made by Nitto Denko Company. For example, No. 3703F, No. 370F and No. 3703DF are available, and these are adhesive sheets each having PP (polypropyrene) film as a base material and having a layer of adhesives of an acryl resin type. With regard to the total thickness of the layer of adhesives, the base material film and the layer of adhesives, Backing Thickness/Total Thickness 30/55, 40/65 and 30/55 (μm) are for the No. 370 series types mentioned above. In this case, Backing Thickness is the thickness of the layer of adhesives of an acryl resin type.

Since the moisture-proof protective film transmits stimulation excited light and photo-stimulated luminescence efficiently, it is desirable that high transmittance is shown in a broad range of wavelength, and the transmittance is 60% or more, but it preferably is 80% or more.

Further, if an antireflection coating of $MgF_2$ is provided on the surface, it has the effect to transmit stimulation excited light and photo-stimulated luminescence efficiently, and to reduce a deterioration of sharpness, which is preferable.

For the purpose of improving sharpness, it is also possible to make a moisture-proof protective film to contain coloring agents such as, for example, lead phosphate to be colored, and to have a function to absorb stimulation excited light.

For that purpose, there is a method to laminate a film colored with a coloring material (pigment or dye) that absorbs stimulation excited light on a film metalized with the metal oxide, or to provide a layer containing dye or pigment on either surface through coating.

As a method to manufacture a colored film, there is a method to form a layer containing coloring agent (pigment or dye) on a plastic film into which a coloring agent is kneaded or on the surface of the plastic film through coating, and it is possible to color through the method to stick a colored plastic film evenly on a moisture-proof protective film by the use of adhesives.

Further, in the present invention, an adhesion layer may be provided beforehand on the substrate surface as occasion demands, to improve a property of adhesion between the substrate and the stimulable phosphor.

The thickness of the substrate is generally in the range of 80-2000 μm, though it may vary depending on the type of material of the substrate, and a thickness ranging from 80 μm to 1000 μm is more preferable from a viewpoint of handling.

Among these alkali-halide-based stimulable phosphors, RbBr-based and CsBr-based phosphors are preferable because of high luminance and high image quality.

Since these phosphor columnar crystals formed by a vapor deposition method are weak against moisture, a moisture-proof protective film, including a film having a metal-oxide-deposited layer, is used for sealing as stated above.

EXAMPLES

Preferred embodiments are concretely described hereunder, but the embodiments of the present invention are not limited thereto.

Example 1

<<Production of Radiation Image Conversion Panel>>

(Production of Coated Type Stimulable Phosphor Layer)

Stimulable phosphor ($BaFBr_{0.85}I_{0.15}$: $0.01Eu^{2+}$) 200 g, polyurethane resin (Pandex T5265 made by Dainippon Ink and Chemical) 8.0 g, and yellowing preventing agent: epoxy resin (EP1001 made by Japan Epoxy Resin) 2.0 g are added to methyl ethyl ketone and dispersed by propeller mixer to prepare a coating solution for forming the phosphor layer having a viscosity of 30 Pa.s (25° C.). This coating solution is then applied on a polyethylene terephthalate film (PET film thick: 300 μm) and a stimulable phosphor sample (stimulable phosphor plate) provided with a stimulable phosphor layer (thickness: 230 μm) is obtained.

(Production of Vapor-Phase Deposited Type Stimulable Phosphor Layer)

On the surface of a substrate made of crystallized glass (made by Nippon Electric Glass) of 1 mm thick and 410 mm×410 mm size, a stimulable phosphor layer provided with stimulable phosphor (CsBr:Eu) is formed by vapor-phase deposition (vapor deposition) device shown in FIG. 1.

In the vapor deposition process, the substrate is placed in the vapor-phase deposition device and then phosphor material (CsBr:Eu) formed by pressing is set in a water-cooled crucible (not shown) as the deposition source.

Then, a pump is connected with the exhaust port of the vapor-phase deposition device to evacuate, the device is charged with nitrogen from the gas inlet (flow rate 1000 sccm (sccm: standard ml/min $(1\times10^{-6} m^3/min)$, and the vacuum in the device is maintained at $6.65\times10^{-3}$ Pa. After the above, the deposition source is heated to 650° C. and then alkali halide phosphor made of CsBr:0.001Eu is vapor-deposited on one side of the glass substrate from the normal direction of the substrate surface (that is, the slit and deposition source are aligned to the normal direction ($\theta 2$=about 0 degrees)) while maintaining the distance (d) from the substrate to the deposition source at 60 cm and conveying the substrate in the direction parallel to the substrate. When the film thickness of the stimulable phosphor layer becomes 400 μm, deposition is terminated. Thus, a stimulable phosphor sample (stimulable phosphor plate) is obtained.

(Production of Layer Having Dehydration Function)

As shown in Table 1, layers having dehydration function are provided using various dehydrators. Production process will be explained hereunder.

<Production of Protective Film on the Phosphor Side of the Stimulable Phosphor Plate: Surface Protective Film>

<Production of Protection Layer Film 1 Upper Portion>

As the protective film on the phosphor side of the stimulable phosphor plate, a polyethylene terephthalate (PET) film of 12 μm thick is prepared.

(Production of Bonding Layer)

Next, adhesive (Byron 300: made by Toyobo) is applied on the film and dried to form a bonding layer (1 μm).

This film with a bonding layer produced as above is called the protection layer film 1 upper portion.

(Production of Protection Layer Film 2 Upper Portion)

A silica gel layer of 1 μm thick having the dehydration function is formed by vapor deposition between the PET and bonding layer of the protection layer film 1 upper portion.

That is, a silica gel layer is provided on the PET of the protective film 1 upper portion and then adhesive (Byron 300: made by Toyobo) is applied on the surface and dried to form a bonding layer (1 μm). This is called the protection layer 2 upper portion.

<Production of Protective Films 1 and 2>

Each protective film 1 and 2 upper portion is further processed to construct as follows, which is then called the protective film 1 and 2.

Above protective film 1 and 2 upper portion/VMPET (12 μm)/sealant film (30 μm)

Protective film 1 and 2 upper portion/VMPET is further laminated on the above bonding layer side.

VMPET: alumina vapor-deposited PET (commercially available: made by Toyo Metalizing) is used.

Sealant film: thermally fusing film made of CPP (casting polypropylene) is used.

The above multi-layer film includes dry lamination bonding layers, which means the thickness of each of bonding layer is 2.5 μm. Adhesive used for dry lamination is two-part reaction type urethane adhesive.

(Production of Exciting Light Absorption Layer)

When an exciting light absorption layer is provided on the protection layer, it is provided on the top PET film of the upper surface of the protective film as shown below.

For the upper surface of the protective film 1: PET (12 μm)/exciting light absorption layer/bonding layer (1 μm)

For the upper surface of the protective film 2: PET (12 μm)/exciting light absorption layer/vapor-deposited silica gel layer (1 μm)/bonding layer (1 μm)

Fluorine base resin: fluoro-olefin-vinyl ether copolymer (Lumifron LF100 made by Asahi Glass, 50 weight % xylene solution) 50 g, bridging agent: isocyanate (Coronate HX made by Nippon Polyurethane, solid content: 100 weight %) 5 g, and alcohol denaturated silicone oligomer (having a dimethyl polysiloxane skeleton and hydroxyl group (carbinol group) on both ends, X-22-2809 made by Shinetsu Chemical, solid content: 66 weight %) 0.5 g are added to methyl ketone solvent to prepare a coating solution having a viscosity of 0.1 to 0.3 Pa·s. Next, a mixture solution of organic blue coloring agent (Zapon Fast Blue 3G made by Hoechst) and silica (grain size of 0.2 to 2.0 μm) dispersed beforehand in methylketon is added, and the coating solution is applied on the surface of the PET film by doctor blade and then the film is heat treated at 120° C. for 20 minutes to cure and form an exciting light absorption layer.

By adjusting the added amount of the coloring agent and silica in this process, an exciting light absorption layer having a required light emission factor can be produced. The light emission factor of the exciting light absorption layer means the light transmission factor at the wavelength of He—Ne laser. The transmission factor of the exciting light absorption layer is set to 96%.

(Production of Protective Film on the Substrate Side of the Stimulable Phosphor Plate: Rear Protective Film)

The protective film on the substrate side (rear of the phosphor side) of the stimulable phosphor plate is a dry lamination film constructed as polyethylene terephthalate (PET) 188 μm/VMPET (12 μm)/sealant film (30 μm).

VMPET: alumina vapor-deposited PET (commercially available: made by Toyo Metalizing)

Sealant film: thermally fusing film made of CPP (casting polypropylene) is used.

The above includes dry lamination bonding layers, which means the thickness of each of bonding layer is 2.5 μm. Adhesive used for dry lamination is two-part reaction type urethane adhesive.

(Production of Protection Layer 3)

Next, a protective film on the substrate side (rear of the phosphor side) of the stimulable phosphor plate is produced, containing a dehydrator layer as constructed below.

(PET) 188 μm/VMPET (12 μm)/PET of 12 μm provided with a vapor-deposited silica gel layer of 6 μm/sealant film (30 μm)

Dehydrator layer: PET of 12 μm provided with a vapor-deposited silica gel layer of 6 μm: a silica gel layer of 6 μm thick is vapor-deposited on PET of 12 μm thick, where the silica gel layer is laminated on the sealant film side.

<<Enclosure of Stimulable Phosphor Plate>>

Each coated type stimulable phosphor plate produced as above is cut into a square of 45 cm×45 cm and enclosed in the protective films 1 and 2 by fusing the peripheral areas of the films by impulse sealer under decreased pressure (see FIG. 1).

In heat-sealing the sheets 3 and 4 by fusing, the sheet 13 is put on the sealant film side of the rear protective film of sheet 14 so that both protective films 1 and 2 are positioned on the sealant film side. 6 is the protection layer.

The sheets are fused so that the distance from the fused part to the peripheral area of the stimulable phosphor plate is 1 mm. The width of the heater of the impulse sealer used for fusing is 8 mm.

The radiation image conversion panels 1 to 17 shown in Table 1 (simply shown as panel in the table) are produced as above.

<<Evaluation of Image of Radiation Image Conversion Panel>>

The following evaluation is performed, using the radiation image conversion panels produced as above.

Accelerated aging+moisture resistance test (Evaluation of Moisture Resistance)

1000 samples are subjected to a thermal cycle of 20° C. for 5.5 hours→temperature increase in 0.5 hour→60° C. for 5 hours→temperature decrease in 1 hour→20° C. for three days. After this, 10 ml of water is evenly sprayed over the protection layer surface and the samples are left to stand for 10 minutes. Then, they are put in a constant temperature oven of 40° C. and 80% for seven days. Aging ratio of luminance of these samples is then measured.

Aging ratio of luminance={1−(luminance after test/initial luminance)}×100%

Judging from the percentage of the samples of which aging ratio of luminance exceeds 20%, the following is evaluation is made.

A: 0 up to less than 10%

B: 10 up to less than 20%

C: 20 up to less than 30%

D: more than 30%

2) Evaluation of Image Unevenness and Linear Noise

After irradiating X-ray of 80 kVp lamp voltage on the radiation image conversion panel, the panel is excited by He—Ne laser beam (633 nm). The stimulable light emitted from the phosphor layer is received by a receiver (photo multiplier having the light receiving sensitivity S-5) and converted to electrical signal, and then the signal is transformed into image by an image processor and the image is printed out in double magnification by an output device. The obtained print image is visually observed to evaluate occurrence of image unevenness and linear noise. Evaluation is made on image unevenness and linear noise separately as follows and the result is shown in Table 1.

A: Neither image unevenness nor linear noise is observed at all.

B: Slight image unevenness and/or linear noise is observed at 1 to 2 places or less on the picture.

C: Slight image unevenness and/or linear noise is observed at 2 to 4 places or less on the picture.

D: Image unevenness and/or linear noise is observed at more than 4 places on the picture but slight ones are at less than 5 places.

E: Heavy image unevenness and/or linear noise is observed at more than 5 places on the picture.

TABLE 1

| Panel No. | Protective Film | Dehydrator | Position Provided | Exciting Light absorption Layer | Accelerated Aging + Moisture Resistance Test | Phosphor Layer Formation | Image unevenness & Linear Noise | Remarks |
|---|---|---|---|---|---|---|---|---|
| 1 | 1 | None | — | Not Provided | D | Coating | E | Comp. |
| 2 | 2 | Evaporated Silica-Gel 1 μm | Protective Film | Not Provided | B | Coating | E | Inv. |
| 3 | 2 | Zeosheet | Under substrate (enclosed, not mentioned hereunder) | Not Provided | A | Coating | E | Inv. |
| 4 | 1 | None | — | Provided | D | Coating | A | Comp. |
| 5 | 2 | Evaporated Silica-Gel 1 μm | Protective Film | Provided | B | Coating | B | Inv. |
| 6 | 1 | Zeosheet | Under substrate | Provided | A | Coating | A | Inv. |
| 7 | 1 | Hygroscopic Polymer 2 g/m² | Under substrate | Provided | A | Coating | A | Inv. |
| 8 | 1 | Evaporated Silica-Gel on PET Substrate 6 μm | Rear Surface of Substrate | Provided | A | Coating | A | Inv. |
| 9 | 2 | Evaporated Silica-Gel 1 μm + Allosheet | Protective Film + Under substrate | Provided | A | Coating | A | Inv. |
| 10 | 2 | Evaporated Silica-Gel 1 μm + | Protective Film + Rear Surface | Provided | A | Coating | A | Inv. |

TABLE 1-continued

| Panel No. | Protective Film | Dehydrator | Position Provided | Exciting Light absorption Layer | Accelerated Aging + Moisture Resistance Test | Phosphor Layer Formation | Image unevenness & Linear Noise | Remarks |
|---|---|---|---|---|---|---|---|---|
| | | Evaporated Silica-Gel on PET substrate 5 μm | of Substrate | | | | | |
| 11 | 1 | None | — | Provided | D | Vapor Deposition | A | Comp. |
| 12 | 3 | Evaporated Silica-Gel 6 μm | Protective Film | Provided | A | Vapor Deposition | B | Inv. |
| 13 | 1 | Zeosheet | Under substrate | Provided | A | Vapor Deposition | A | Inv. |
| 14 | 1 | Hygroscopic Polymer 2 g/m² | Under substrate | Provided | A | Vapor Deposition | | Inv. |
| 15 | 1 | Evaporated Silica-Gel on PET substrate 6 μm | Rear Surface of Substrate | Provided | A | Vaapor Deposition | A | A |
| 16 | 2 | Evaporated Silica-Gel 1 μm + Zeosheet | Protective Film + Under substrate | Provided | A | Vaapor Deposition | A | Inv. |
| 17 | 2 | Evaporated Silica-Gel 1 μm + Evaporated Silica-Gel on PET substrate 5 μm | Protective Film + Rear Surface of Substrate | Provided | A | Vaapor Deposition | A | Inv. |

*Hygroscopic Polymer: Hygroscopic Resin Disclosed in Example 1 of JP-A 2004-001355.
*Presence of Exiting Light Absorption Layer means Presence of Coloring Agent.
*Protective Film 2: Provided on phosphor layer side surface of substrate.
*Protective Film 3: Provided on rear side surface of substrate.

As clearly shown in Table 1, it is understood that the present invention is superior to the comparative samples in accomplishing the object of the present invention.

Example 2

In Example 2, plural types of samples, each having a different stimulable phosphor plate thickness (those corresponding to radiation image conversion panels) were manufactured, and creases and waves on moisture-proof protective films were observed on each sample.

(1) Preparation of Samples

A 0.5 mm-thick stimulable phosphor layer was formed by a vapor deposition method on a square 20×20 cm aluminum substrate, whereby, the stimulable phosphor plate was prepared. Simultaneously, there were prepared the first moisture-proof protective film in which a PET layer having a thickness of 24 μm and a CPP layer having a thickness of 30 μm are laminated and the second moisture-proof protective film in which a PET layer having a thickness of 100 μm and a CPP layer having a thickness of 30 μm are laminated.

After that, the CPP layer of the first moisture-proof protective film was caused to face the stimulable phosphor layer of the stimulable phosphor plate, and the CPP layer of the second moisture-proof protective film was caused to face the substrate of the stimulable phosphor plate, and the first and second moisture-proof protective films were superposed on each other, while the aforesaid state was maintained. Then, peripheral areas respectively of the first and second moisture-proof protective films were fused by an impulse heat sealer, while decompressing the space surrounded by the first and second moisture-proof protective films, and thereby, the stimulable phosphor plate was sealed in the first and second moisture-proof protective films.

Incidentally, when fusing peripheral areas respectively of the first and second moisture-proof protective films, an impulse heat sealer in which a 3 mm heater was used, and processing was conducted so that a distance from the fused portion between the first and second moisture-proof protective films to the peripheral area of the stimulable phosphor plate may turn out to be 3 mm.

Five types of samples A-E each being of a different substrate thickness and being in quantity of 10 were prepared by the aforesaid preparing method. The thickness of the substrate for each of samples A-E is shown in following Table 1.

(2) Observation of Creases and Waves

Surfaces of samples A-E were subjected to visual observation, and the number of samples in each of which creases and waves were formed on the second moisture-proof protective film were counted for each of samples A-E. The results of the observation (the number of samples on which creases and waves were formed) are shown in the following Table 2.

TABLE 2

|          | Thickness of Substrate (mm) | Thickness of stimulable Phosphor Layer (mm) | Thickness of Stimulable phosphor plate (mm) | Creases | Waves |
|----------|-----------------------------|---------------------------------------------|---------------------------------------------|---------|-------|
| Sample A | 0.5                         | 0.5                                         | 1.0                                         | 0       | 0     |
| Sample B | 0.2                         | 0.5                                         | 0.7                                         | 0       | 0     |
| Sample C | 1.5                         | 0.5                                         | 2.0                                         | 0       | 0     |
| Sample D | 0.1                         | 0.5                                         | 0.6                                         | 0       | 2     |
| Sample E | 1.8                         | 0.5                                         | 2.3                                         | 8       | 4     |

As shown in Table 2, samples showing creases and waves were hardly observed in samples A-D each having a thickness of the stimulable phosphor plate of 2 mm or less, but many samples showing creases and waves were observed in sample E having the thickness of the stimulable phosphor plate exceeding 2 mm. From the foregoing, it was found that the stimulable phosphor plate can be sealed by the first and second moisture-proof protective films without any generation of creases a waves on the first and second moisture-proof protective films, in the radiation image conversion panel having a thickness of the stimulable phosphor plate of 2 mm or less.

Example 3

In Example 3, plural types of samples, each having a different stimulable phosphor plate thickness (those corresponding to radiation image conversion panels) were manufactured, and presence of formed creases and waves on the moisture-proof protective film and presence of sensitivity deterioration were observed and evaluated for each sample.

(1) Preparation of Samples

A 0.5 mm-thick stimulable phosphor was formed by a vapor deposition method on a 20×20 cm square aluminum substrate, whereby, a stimulable phosphor plate was prepared. Simultaneously, there were prepared first moisture-proof protective film in which a 12 μm-thick PET layer, a 12 μm-thick PET layer of deposited alumina and a 30 μm-thick CPP layer are laminated and second moisture-proof protective film in which a 188 μm-thick PET layer, a 9 μm-thick aluminum layer (aluminum foil) and a 30 μm-thick CPP layer are laminated. Incidentally, in the 12 μm-thick PET layer of deposited alumina in first moisture-proof protective film, the surface on which alumina is deposited faces the CPP layer, and is in contact with the CPP layer.

After that, the CPP layer of the first moisture-proof protective film was made to face the stimulable phosphor layer of the stimulable phosphor plate, and the CPP layer of the second moisture-proof protective film was made to face the substrate of the stimulable phosphor plate, after which, first and second moisture-proof protective films were superposed on each other, while the aforesaid state was kept. Then, peripheral areas respectively of the first and second moisture-proof protective films were fused by an impulse heat sealer, while decompressing the space surrounded by the first and second moisture-proof protective films, and thereby, the stimulable phosphor plate was sealed in the first and second moisture-proof protective films.

Incidentally, when fusing peripheral areas respectively of the first and second moisture-proof protective films, an impulse heat sealer in which a 3 mm heater was used, and processing was conducted so that the distance from the fused portion between the first and second moisture-proof protective films to the peripheral area of the stimulable phosphor plate may turn out to be 3 mm.

Three types of samples F-H each being of a different substrate thickness and being in the quantity of 10 were prepared by the aforesaid preparing method. The thickness of the substrate for each of samples F-H is shown in the following Table 3.

(2) Observation for Creases and Waves

Surfaces of samples F-H were subjected to visual observation, and the number of samples in each of which creases and waves were formed on the second moisture-proof protective film were counted for each of samples F-H. The results of the observation (the number of samples on which creases and waves were formed) are shown in the following Table 3.

(3) Evaluation of Sensitivity Deterioration

Respective samples F-H were left for three months under a high temperature environment including temperature of 40° C. and humidity of 90%, and then, the ratio of sensitivity of each sample left for three months to that of each sample before being left for three months (sensitivity after being left for three months/sensitivity before being left for three months) was calculated for each of samples F-H. Results of the calculations are shown in following Table 3. Incidentally, the numerical values in Table 3 are mean values for 10 samples in respective samples F-H, and it is shown that the closer the value is to "1", the less is the deterioration of sensitivity.

Incidentally, in the measurement of sensitivity for each of samples F-H, each of samples F-H was irradiated by X-rays with tube voltage of 80 kVp, then, the surface of each of samples F-H (the surface on which the stimulable phosphor layer was formed) was scanned by a He—Ne semiconductor laser (wavelength 633 nm) to excite the stimulable phosphor layer, and the quantity of light (light intensity) of photostimulated luminescence radiated from the stimulable phosphor layer was measured by a photo detector (photomultiplier with spectral sensitivity S-5), whereby, the measured value therefrom was made to represent "sensitivity".

TABLE 3

|          | Thickness of Substrate (mm) | Thickness of stimulable Phosphor Layer (mm) | Thickness of Stimulable phosphor plate (mm) | Crease | Waves | Sensitivity Deterioration |
|----------|-----------------------------|---------------------------------------------|---------------------------------------------|--------|-------|---------------------------|
| Sample F | 0.5                         | 0.5                                         | 1.0                                         | 0      | 0     | 1                         |
| Sample G | 1.5                         | 0.5                                         | 2.0                                         | 0      | 0     | 1                         |
| Sample H | 1.8                         | 0.5                                         | 2.3                                         | 7      | 5     | 0.5                       |

As shown in Table 3, samples showing creases and waves were not observed in samples F-G each having a thickness of the stimulable phosphor plate of 2 mm or less, and no deterioration of sensitivity was observed. In contrast to this, many samples showing creases and waves were observed in sample H having a thickness of the stimulable phosphor plate exceeding 2 mm, and remarkable deterioration of sensitivity was observed in spite of the first moisture-proof protective film on which alumina was deposited. It is presumed that the reason why deterioration of sensitivity was remarkable in sample H is that a fused portion between the first moisture-proof protective film and the second moisture-proof protective film was not fused completely, and the alumina-deposited layer was destroyed on the portion where creases were formed. From the foregoing, it was found that the stimulable phosphor plate can be sealed by the first and second moisture-proof protective films without any generation of creases and waves on the first and second moisture-proof protective films, in the radiation image conversion panel having a thickness of the stimulable phosphor plate of 2 mm or less and having an alumina-deposited layer on the first moisture-proof protective film.

Example 4

An example of the specific structure of a radiation image conversion panel of the present invention and manufacture thereof will be explained as follows.

A specific embodiment will be described as follows, regarding a method to manufacture a radiation image conversion panel by heat-sealing respective moisture-proof protective films by the use of a adhesive sheet composed of a heat-sealable resin which is stuck on the circumferential portion where no stimulable phosphor layer exists on the surface where stimulable phosphor layer is formed by covering the obverse surface and the reverse surface of the phosphor plate with two moisture-proof protective films, in such a way that the adhesive sheet makes a turn from the phosphor side (a surface) to the reverse side, which is shown in FIG. 7.

Figure 8:
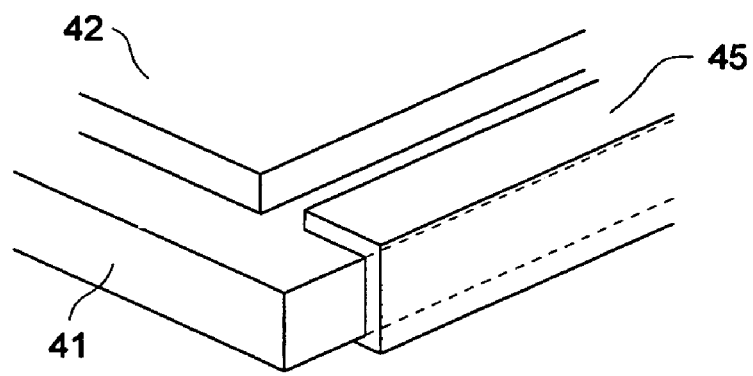
FIG. 8 is a diagram showing how an adhesive sheet covers both the peripheral areas of stimulable phosphor layer side and the rear side of a stimulable phosphor plate.

FIG. 8 shows how adhesive sheet 45 (PPS adhesive sheet No. 3703F made by Nittou Denkou Co. was used) whose base is heat-sealable resin sheet is stuck on a peripheral area (a part thereof is shown) where no phosphor of the phosphor plate is formed, so that the top, the back and the end face of the peripheral area, where no phosphor is formed, may be covered by the adhesive sheet. In this way, the adhesive sheets are stuck on all of the circumferences, including the four corners, of the phosphor plate.

Figure 9:
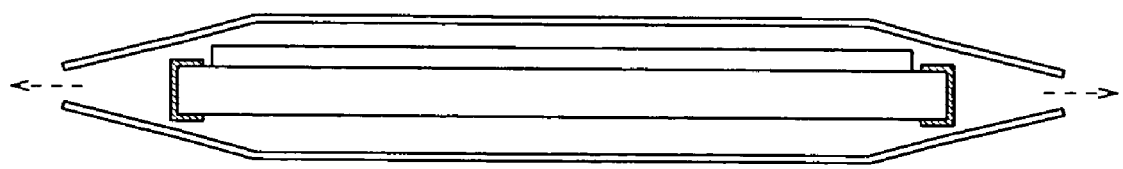
FIG. 9 is a diagram showing how a moisture-proof protective films are arranged on the stimulable phosphor layer side and the rear side of a stimulable phosphor plate.
Figure 10:
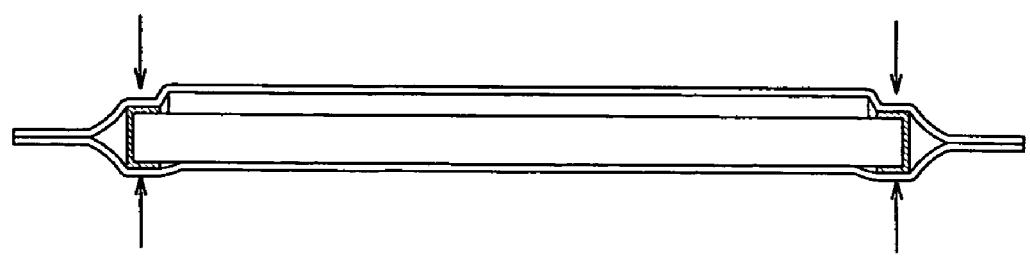
FIG. 10 is a diagram showing how a stimulable phosphor plate is sealed between two moisture-proof protective films.

Then, a moisture-proof protective film, specifically, a moisture-proof protective films wherein a 12 μm-thick VMPET; alumina-deposited polyethylene terephthalate (made by Toyo Metalizing Co.) is laminated with 30 μm-thick casting polypropylene (CPP) through dry lamination is arranged on each of the upper side and the lower side of the substrate, so that the casting polypropylene film may face the phosphor surface of the phosphor plate and the substrate surface (FIG. 9), and the moisture-proof protective films on the surface and the reverse side are brought into close contact with the phosphor layer the surface on which the adhesive sheet is stuck in the vicinity of the phosphor layer, and with the reverse side of the substrate as shown in FIG. 10.

After the moisture-proof protective films are stuck to each other in the aforesaid manner, the peripheral area (arrow) where adhesive sheet is stuck on the obverse side and the reverse side is heated to be fused from the moisture-proof film side at the temperature of 200° C. in the case of polypropylene, for example. A laminating system, for example, to heat and fuse the peripheral area with an impulse sealer, or to press and heat between two heated rollers, may also be employed. Due to this, the moisture-proof protective films are sealed to each other when the hot-melting resin films are heat-fused each other, and the phosphor plate can be sealed (FIG. 10).

Figure 11:
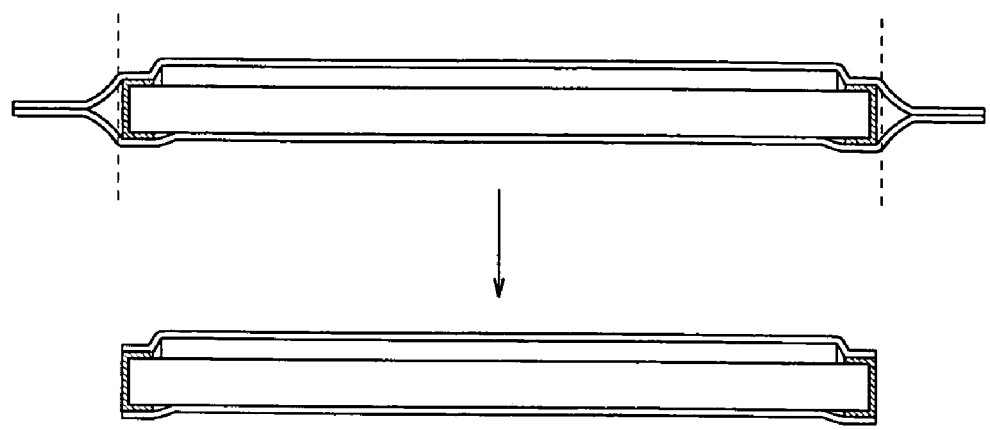
FIG. 11 is a sectional view of the obtained radiation image conversion panel.

With respect to the remainder of the moisture-proof protective film in the neighborhood of the heat-sealed portion, it is cut as shown (with broken lines) in FIG. 11 after heat-fusing, and a radiation image conversion panel can be obtained finally.

Regarding the heat-sealing method stated above, it is not limited in particular, and sealing may be carried out under the condition of the atmospheric pressure. However, in the method to conduct heat-sealing with an impulse sealer mentioned above, it is preferable to conduct heat-sealing under the condition of the decompressed surroundings, from the viewpoints of preventing positional shifting of the stimulable phosphor plate in the moisture-proof protective film and of eliminating moisture in the air.

When sealing the stimulable phosphor plate with a moisture-proof protective film of the present invention on which a metal oxide layer is deposited, if the resin layer, on the outermost layer on the side where the moisture-proof protective film is in contact with the stimulable phosphor plate, is made to be a resin film having heat-sealing characteristics, the moisture-proof protective film becomes to be heat-sealable, and the operation to seal the stimulable phosphor plate is made to be efficient.

Some 0.01-1.0% by weight of inorganic fine particles of silica, titanium or zeolite may be contained in the resin film having a heat-sealing property, whereby image unevenness with a large cycle caused by operations to seal the stimulable phosphor plate through heat-sealing can be prevented, which is preferable. When the amount of fine particles is not more than 0.01% by weight, the effect is less, and when it is not less than 1.0% by weight, transparency of laminated protective films and haze values are deteriorated.

For the purpose of improving adhesion property on the portion where the moisture-proof protective film is in close contact with the stimulable phosphor, a subbing layer may further be provided on the surface touching the moisture-proof protective film, on the phosphor surface, or a surface roughening processing may be conducted on the phosphor surface.

In the radiation image conversion panel of the present invention, it is preferable to make the moisture-proof protective film on the substrate side to be an aluminum laminated film, for improving the moisture-resistance, because the moisture-proof protective film of the phosphor plate on the substrate side can be optically opaque.

The thickness of the aluminum foil film used for lamination is preferably 9 μm or more from the viewpoint of deterioration of moisture-resistance caused by pinholes. Further, it is preferable that the moisture-proof protective film on the substrate side is also 200 μm or less in terms of a thickness, as in the moisture-proof protective film on the phosphor surface side. Namely, it is preferable to make moisture-proof protective film 43 on the substrate surface side to be a laminated moisture-proof film wherein one or more aluminum film is laminated, in FIG. 7. Owing to this, moisture entering can surely be reduced.

A resin layer, having heat-sealing properties on the outermost layer on the side where the radiation image conversion panel of the present invention is in contact with the phosphor surface of the moisture-proof protective film may be, or may not be stuck to the phosphor surface, but, adhesiveness is improved by the aforesaid formed organic layer.

In the radiation image conversion panel of the present invention, when the thickness of the moisture-proof protective film exceeds 200 µm, handleability of the film in the course of sealing is worsened, and heat-sealing by an impulse sealer, described later, becomes difficult. Therefore, the thickness of 200 µm is desirable.

(Low-Refractive-Index Layer)

In the present invention, a low-refractive-index layer may be provided in the aforesaid structure. The low-refractive-index layer is composed of a material whose refractive index is lower than that of the resin material that constitutes the moisture-proof protective film, and existence of this layer can reduce the decline of image sharpness even when a protective layer and a moisture-proof protective film are made to be thick. For example, the substances shown below can be used, and they are preferably used in the state of a thin film formed by a vapor growth method, such as deposition.

| Substance | Refractive index |
| --- | --- |
| CaF | 1.23–1.26 |
| $Na_2AlF_6$ | 1.35 |
| $MgF_2$ | 1.38 |
| $SiO_2$ | 1.46 or the following liquid layer can be used |
| Ethyl alcohol | 1.36 |
| Methyl alcohol | 1.33 |
| Diethyl alcohol | 1.35 |

Further, if a layer whose refractive index is substantially 1, such as a gaseous layer of air, nitrogen or argon or a vacuum layer, is used as a low-refractive-index layer of the present invention, the effect to prevent a decline of sharpness is high, which is especially preferable.

It is practical that the thickness of the low-refractive-index layer of the present invention is in the range from 0.05 µm to 3 µm.

The low-refractive-index layer of the present invention may either be in close contact with a stimulable phosphor layer or be away from it.

(Radiographing Method)

Figure 12:
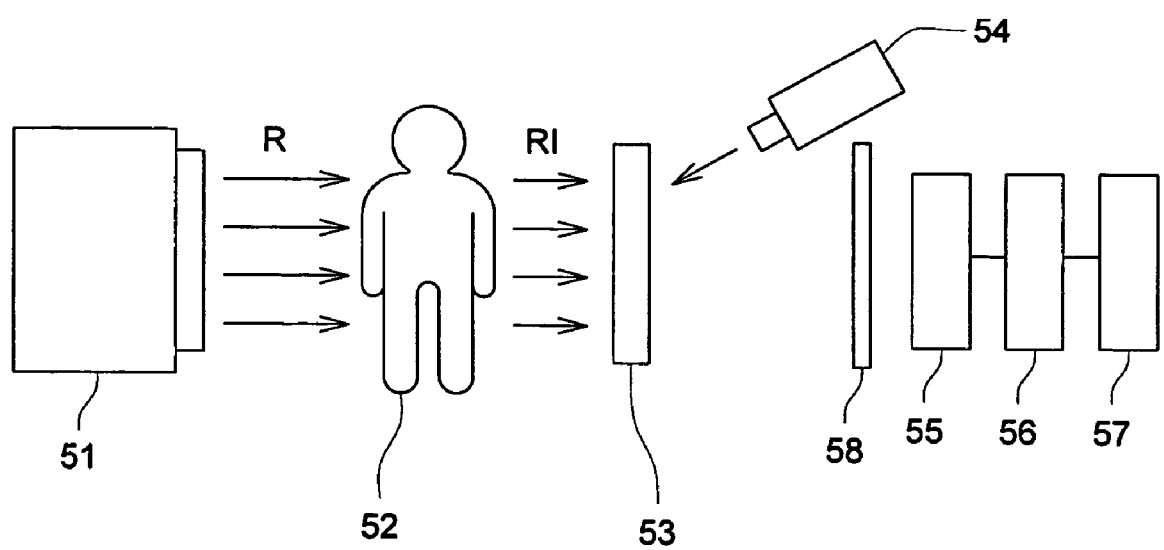
FIG. 12 is a diagram showing schematically a radiation image conversion method employing a radiation image conversion panel of the present invention.

A radiation image conversion method employing a radiation image conversion panel of the present invention is schematically shown in FIG. 12.

Namely, in FIG. 12, 51 represents a radiation generating apparatus, 52 represents a subject, 53 represents a radiation image conversion panel relating to the present invention, 54 represents a stimulable excitation light source (such as a laser), 55 represents a photoelectric conversion apparatus that detects stimulable fluorescence radiated by the conversion panel, 56 represents an apparatus that reproduces signals, detected by 25, as images, 57 represents an apparatus that displays the reproduced images, and 58 represents a filter that separates stimulable excitation light from stimulable fluorescence, and transmits only stimulable fluorescence. Incidentally, numeral 55 and thereafter have only to be one that can reproduce optical information from 53 as an image in some form, and they are not limited to the foregoing.

As shown in FIG. 12, radiation (R) radiated from radiation generating apparatus 51 passes through subject 52 to enter radiation image conversion panel 53 (RI). This radiation having entered is absorbed by the stimulable layer of the panel 53, then, its energy is accumulated, and an accumulation image of radiographic image is formed.

Next, this accumulation image is excited by stimulable exciting light emitted by stimulable excitation light source 54 to be radiated as photo-stimulated luminescence.

Since the amount of the photo-stimulated luminescence thus radiated is proportional to the amount of accumulated radiation energy, a radiation transmission image of the subject can be observed by converting photoelectrically the optical signal by photoelectric conversion apparatus 55 such as, for example, a photomultiplier, then, by reproducing it by image reproducing apparatus 56 and by displaying it by image displaying apparatus 57.

Thus, the structure of the present invention has made it possible to obtain a radiation image conversion panel that has high moisture-resistance and long service life.

In the structure shown in FIG. 6 or FIG. 7 of the present invention, a phosphor layer is sealed between a substrate and a moisture-proof protective film, whereby the thickness of the sealed portion is small, thus, creases are not caused remarkably at the four corners of the sealed phosphor plate, and sealing is uniform and the sealing effect is high.

In the structure shown in FIG. 7, creases are not caused, moisture transmittance is low and a highly durable radiation image conversion panel is attained due to the phosphor being completely sealed by heat-sealable resin such as, for example, polypropylene having low moisture transmittance.

What is claimed is:

1. A radiation image conversion panel comprising:
 a stimulable phosphor plate having a stimulable phosphor layer on a substrate;
 a first protective film provided on a stimulable phosphor layer side of the stimulable phosphor plate, the first protective film not being adhered to the surface of the stimulable phosphor layer and having a peripheral area extending outside of the stimulable phosphor plate; and
 a second protective film provided on the under side of the stimulable phosphor plate opposite to the stimulable phosphor layer side, the second protective film having a peripheral area extending outside of the stimulable phosphor plate,
 wherein:
 the peripheral area of the first protective film and the peripheral area of the second protective film are heat-sealed with each other;
 and the radiation image conversion panel comprises a dehydrator between the substrate and the second protective film to dehydrate a space surrounded by the first protective film and the second protective film.

2. The radiation image conversion panel of claim 1, wherein:
 at least one of the first protective film and the second protective film has a dehydrating function; and
 the stimulable phosphor layer is formed by a coating method.

3. The radiation image conversion panel of claim 1, wherein:
 at least one of the first protective film and the second protective film has a dehydrating function; and
 the stimulable phosphor layer is formed by a vapor deposition method.

4. The radiation image conversion panel of claim 1, wherein:

the first protective film and the second protective film enclose both the dehydrator and the stimulable phosphor plate; and the stimulable phosphor layer is formed by a coating method.

5. The radiation image conversion panel of claim 1, wherein:

the first protective film and the second protective film enclose both the dehydrator and the stimulable phosphor plate; and the stimulable phosphor layer is formed by a vapor deposition method.

6. The radiation image conversion panel of claim 1, wherein:

the stimulable phosphor plate has a dehydrating function; and the stimulable phosphor layer is formed by a coating method.

7. The radiation image conversion panel of claim 1, wherein:

the stimulable phosphor plate has a dehydrating function; and the stimulable phosphor layer is formed by a vapor deposition method.

8. The radiation image conversion panel of claim 1, wherein the first protective film contains an excited light absorbing layer, the excited light absorbing layer being a colored layer so that the excited light is absorbed.

9. The radiation image conversion panel of claim 1, wherein the first protective film and the second protective film are moisture-proof protective films.

10. The radiation image conversion panel of claim 9, wherein:

the stimulable phosphor layer is formed by a vapor deposition method; and a thickness of the stimulable phosphor plate is not more than 2 mm.

11. The radiation image conversion panel of claim 10, wherein a thickness of the substrate is not less than 0.2 mm.

12. The radiation image conversion panel of claim 10, wherein:

the first protective film has a laminated structure containing two or more resin layers; and a resin layer facing the stimulable phosphor layer is a heat-sealable layer.

13. The radiation image conversion panel of claim 10, wherein the first protective film has a laminated structure containing a metal oxide layer.

14. The radiation image conversion panel of claim 10, wherein the second protective film has a laminated structure containing an aluminum layer.

15. The radiation image conversion panel of claim 1, wherein the dehydrator is a silica-gel evaporated on a rear surface of the substrate.

16. The radiation image conversion panel of claim 1, wherein the dehydrator is a dehydrator sheet provided between the substrate and the second protective film.

17. The radiation image conversion panel of claim 1, wherein the dehydrator is a hygroscopic polymer.

18. A radiation image conversion panel comprising:

a stimulable phosphor plate having a stimulable phosphor layer formed by a vapor deposition method on a substrate, the substrate having a peripheral area on a stimulable phosphor layer side of the substrate where the stimulable phosphor layer is not formed;

an adhesive sheet containing a heat-sealable resin layer which covers both (i) the peripheral area of the stimulable phosphor layer side of the substrate where the stimulable phosphor layer is not formed and (ii) a peripheral area of the opposite side of the substrate to the stimulable phosphor layer by folding the adhesive sheet containing the heat-sealable resin sheet; and a first protective film provided on the stimulable phosphor layer side of the substrate and a second protective film provided on the opposite side of the substrate to the stimulable phosphor layer, wherein:

the first protective film is heat-sealed with the substrate at the peripheral area of the stimulable phosphor layer side of the substrate where the stimulable phosphor layer is not formed and the second protective film is heat-sealed at the peripheral area of the opposite side of the substrate using the adhesive sheet containing the heat-sealable resin layer.

19. The radiation image conversion panel of claim 18, wherein an outer most layer of the protective film facing the stimulable phosphor layer is a heat-sealable resin layer.

20. The radiation image conversion panel of claim 18, wherein the protective film has a laminated structure containing a resin layer on which a metal oxide layer is formed by evaporation.

21. The radiation image conversion panel of claim 18, wherein an alkali-halide stimulable phosphor layer is formed by a vapor deposition method on the substrate, the alkali-halide stimulable phosphor being represented by Formula (1):

$$M^1X \cdot aM^2X'_2 \cdot M^3X''_3 : eA \qquad \text{Formula (1)}$$

wherein: $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; and $M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen selected from the group consisting of F, Cl, Br and I; A represents a metal selected from the group consisting of Eu, TB, In, Ga, Cs, Ce, Tm, Dy, Pr, Ho, Nd, Yb, Er, Gd, Ru, Sm, Y, Tl, Na, Ag, Cu and Mg; and a, b and e represent values of $0 \leq a < 0.5$, $0 \leq b < 0.5$ and $0 \leq e < 0.2$, respectively.

* * * * *